(12) United States Patent  (10) Patent No.: US 7,455,717 B2
Sprinkle  (45) Date of Patent: Nov. 25, 2008

(54) APPARATUS AND METHOD OF PROVIDING CONCENTRATED PRODUCT GAS

(75) Inventor: Thomas B. Sprinkle, Rocky River, OH (US)

(73) Assignee: Invacare Corporation, Elyria, OH (US)

( * ) Notice: Subject to any disclaimer, the term of this patent is extended or adjusted under 35 U.S.C. 154(b) by 407 days.

(21) Appl. No.: 11/258,480

(22) Filed: Oct. 25, 2005

(65) Prior Publication Data

US 2006/0086251 A1  Apr. 27, 2006

Related U.S. Application Data

(60) Provisional application No. 60/621,808, filed on Oct. 25, 2004.

(51) Int. Cl.
B01D 53/04 (2006.01)
A61M 16/10 (2006.01)

(52) U.S. Cl. .................. 95/22; 95/96; 96/121; 96/116; 128/204.21; 128/204.26; 128/205.24

(58) Field of Classification Search .................... 95/22, 95/95–106, 130; 96/108, 121, 115, 116; 128/204.21, 204.23, 204.26, 205.24
See application file for complete search history.

(56) References Cited

U.S. PATENT DOCUMENTS

| | | | |
|---|---|---|---|
| 4,449,990 A | | 5/1984 | Tedford, Jr. |
| 4,561,287 A | | 12/1985 | Rowland |
| 4,826,510 A | | 5/1989 | McCombs |
| 4,932,402 A | * | 6/1990 | Snook et al. ............ 128/204.23 |
| 4,971,609 A | | 11/1990 | Pawlos |
| 5,099,837 A | * | 3/1992 | Russel et al. ............ 128/204.26 |
| 5,626,131 A | * | 5/1997 | Chua et al. ............. 128/204.23 |
| 5,720,276 A | * | 2/1998 | Kobatake et al. ........ 128/204.18 |
| 5,906,672 A | | 5/1999 | Michaels et al. |
| 5,917,135 A | | 6/1999 | Michaels et al. |
| 5,988,165 A | | 11/1999 | Richey, II et al. |

(Continued)

FOREIGN PATENT DOCUMENTS

EP   1661596 A2   5/2006

OTHER PUBLICATIONS

Int'l App. No. PCT/US07/18468, Int'l Search Report, 4 pages, mailed Feb. 11, 2008.

(Continued)

*Primary Examiner*—Frank M Lawrence
(74) *Attorney, Agent, or Firm*—Calfee, Halter & Griswold LLP

(57) ABSTRACT

In one aspect, a product gas concentrator is provided. In one embodiment, the apparatus may include: a first process separating adsorbable components from a source gaseous mixture, a second process providing concentrated product gas in a continuous output mode, a third process providing concentrated product gas in a pulsed output mode, and a fourth process selectively switching between the continuous and pulsed output modes. In another embodiment, the apparatus may include: a first process pressurizing a source gaseous mixture, a second process separating adsorbable components from the pressurized gaseous mixture, a product tank accumulating concentrated product gas for dispensing, an output path, a third process selecting a volume to be dispensed during a predetermined time, a pressure sensor monitoring pressure of the concentrated product gas, and a fourth process controlling flow of the concentrated product gas in response to the selected volume and the monitored pressure.

28 Claims, 34 Drawing Sheets

U.S. PATENT DOCUMENTS

| | | | |
|---|---|---|---|
| 6,427,690 B1 * | 8/2002 | McCombs et al. | 128/204.26 |
| 6,520,176 B1 | 2/2003 | Dubois et al. | |
| 6,629,525 B2 | 10/2003 | Hill et al. | |
| 6,651,658 B1 | 11/2003 | Hill et al. | |
| 6,691,702 B2 | 2/2004 | Appel et al. | |
| 6,764,534 B2 | 7/2004 | McCombs et al. | |
| 6,949,133 B2 | 9/2005 | McCombs et al. | |
| 7,329,304 B2 | 2/2008 | Bliss et al. | |
| 2002/0053286 A1 * | 5/2002 | Czabala | 95/130 |
| 2004/0079359 A1 * | 4/2004 | Aylsworth et al. | 128/200.14 |

OTHER PUBLICATIONS

Int'l App. No. PCT/US07/18468, Written Opinion of the Int'l Searching Authority, 7 pages, mailed Feb. 11, 2008.

Invacare Corp., Oxygen Products Brochure, Form No. 05-054, 20 pages, Copyright 2005.

Int'l App. No. PCT/US08/61022, Int'l Search Report, 2 pages, mailed Jul. 18, 2008.

Int'l App. No. PCT/US08/61022, Written Opinion of the Int'l Searching Authority, 5 pages, mailed Jul. 18, 2008.

* cited by examiner

Continuous Mode:
Product Flow Control Valve Flowchart

Pulsed Mode:
Product Flow Control Valve Flowchart

770

APPARATUS AND METHOD OF PROVIDING CONCENTRATED PRODUCT GAS

This application claims priority to U.S. Provisional Pat. App. Ser. No. 60/621,808, filed Oct. 25, 2004, the contents of which are fully incorporated herein by reference.

BACKGROUND

Various applications exist for the separation of gaseous mixtures. For example, the separation of nitrogen from atmospheric air can provide a highly concentrated source of oxygen. These various applications include the provision of elevated concentrations of oxygen for medical patients and flight personnel. Hence, it is desirable to provide systems that separate gaseous mixtures to provide a concentrated product gas, such as a breathing gas with a concentration of oxygen.

Several existing product gas or oxygen concentrators, for example, are disclosed in U.S. Pat. Nos. 4,449,990, 5,906,672, 5,917,135, and 5,988,165 which are commonly assigned to Invacare Corporation of Elyria, Ohio and fully incorporated herein by reference.

SUMMARY

In one aspect, an apparatus for providing a concentrated product gas is provided. In one embodiment, the apparatus may include: a gaseous component separation process separating one or more adsorbable components from a source gaseous mixture to form a concentrated product gas, a continuous output process adapted to provide the concentrated product gas in a continuous output mode, a pulsed output process adapted to provide the concentrated product gas in a pulsed output mode, and a mode selection process selectively switching between the continuous output mode and the pulsed output mode.

In another embodiment, the apparatus may include: a pressurizing process pressurizing a source gaseous mixture to form a pressurized gaseous mixture, a gaseous component separation process separating one or more adsorbable components from the pressurized gaseous mixture to form a concentrated product gas, a product tank in communication with the gaseous component separation process, the product tank accumulating a volume of the concentrated product gas for dispensing, an output path in communication with the product tank and adapted to selectively dispense the concentrated product gas, a volume selection process selecting a volume of concentrated product gas to be dispensed via the output path during a predetermined time, a pressure sensor monitoring a pressure of the concentrated product gas in the output path, and means for controlling a flow of the concentrated product gas through the output path in response to the selected volume and the monitored pressure.

In another aspect, a method of providing a concentrated product gas is provided. In one embodiment, the method may include: a) separating one or more adsorbable components from a source gaseous mixture to form a concentrated product gas, b) providing the concentrated product gas in a continuous output mode or in a pulsed output mode, and c) in response to a predetermined condition, selectively switching between the continuous output mode and the pulsed output mode.

In another embodiment, the method may include: a) pressurizing a source gaseous mixture to form a pressurized gaseous mixture, b) separating one or more adsorbable components from the pressurized gaseous mixture to form a concentrated product gas, c) accumulating a volume of the concentrated product gas in a product tank for dispensing via an output path, d) selecting a volume of concentrated product gas to be dispensed via the output path during a predetermined time, e) monitoring a pressure of the concentrated product gas in the output path, and f) controlling a flow of the concentrated product gas through the output path in response to the selected volume and the monitored pressure.

DETAILED DESCRIPTION

Figure 1:
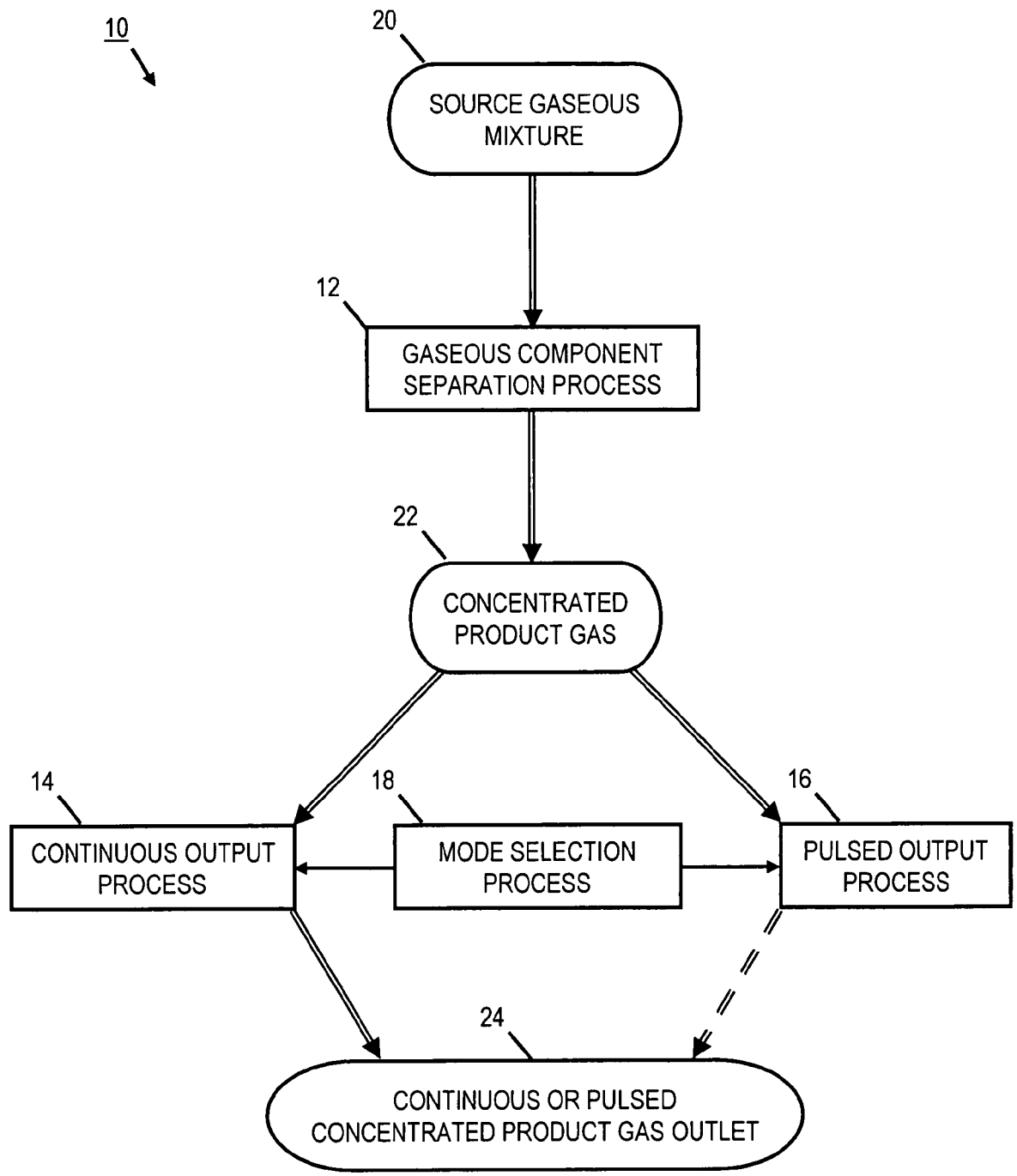
FIG. 1 is a block diagram of an exemplary embodiment of a product gas concentrator.

Each of the various elements and/or steps in the drawings and corresponding descriptions below may be implemented in hardware, software, or a combination thereof. Flow of a gaseous mixture or a concentrated product gas is typically depicted in the drawings by double-lined paths. Single-line paths in the drawings typically represent signal communications. Certain closed flow paths may be depicted in dashed double lines.

With reference to FIG. 1, an exemplary embodiment of a product gas concentrator 10 may include a gaseous component separation process 12, a continuous output process 14, a pulsed output process 16, and a mode selection process 18. Generally, the product gas concentrator 10 may provide a concentrated product gas (e.g., a breathing gas with a concentration of oxygen) in either a continuous output mode or a pulsed output mode.

The gaseous component separation process 12 may be adapted to receive a source gaseous mixture 20 (e.g., atmospheric air or ambient air). The gaseous component separation process 12 may separate one or more adsorbable components (e.g., nitrogen, carbon monoxide, carbon dioxide, water vapor, etc.) from the source gaseous mixture 20 to form a concentrated product gas 22. The continuous output process 14 may be adapted to receive the concentrated product gas 22 and, if selected by the mode selection process 18, may provide continuous concentrated product gas to a continuous or pulsed concentrated product gas outlet 24. The pulsed output process 16 may also be adapted to receive the concentrated product gas 22 and, if selected by the mode selection process 18, may provide pulsed concentrated product gas to the continuous or pulsed concentrated product gas outlet 24. Thus, the mode selection process 18 determines whether the continuous or pulsed concentrated product gas outlet 24 provides a continuous concentrated product gas or a pulsed concentrated product gas by selecting either the continuous output process 14 or the pulsed output process 16. As shown, the continuous output process 14 is selected.

Figure 2:
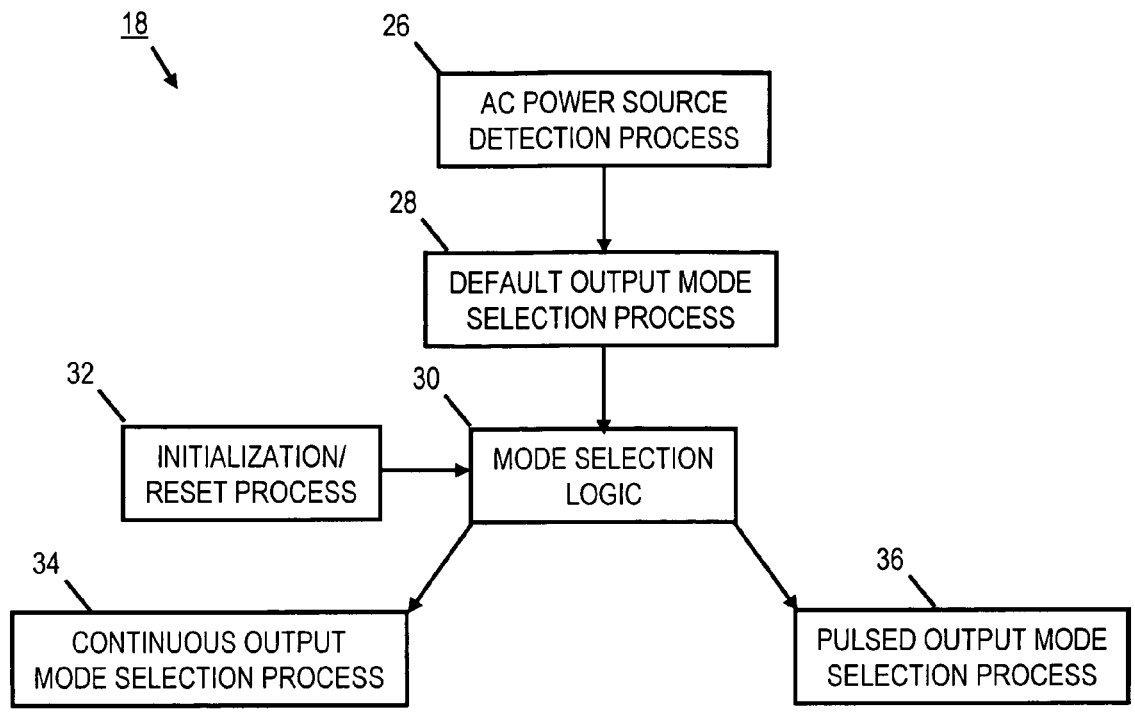
FIG. 2 is a block diagram of an exemplary embodiment of a mode selection process associated with the product gas concentrator of FIG. 1.

With reference to FIG. 2, an exemplary embodiment of the mode selection process 18 may include an AC power source detection process 26, a default output mode selection process 28, a mode selection logic 30, an initialization/reset process 32, a continuous output mode selection process 34, and a pulsed output mode selection process 36. The AC power source detection process 26 may be adapted to detect that the product gas concentrator (e.g., FIG. 1, 10) is connected to an AC power source. The default output mode selection process 28 may receive a signal from the AC power source detection process 26 after connection to an AC power source is detected and, upon receiving the signal, may select the continuous output mode as a default output mode. The initialization/reset process 32 may operate when the product gas concentrator is powered on or reset and, for example, on either power-on or reset, may send a corresponding signal to the mode selection logic causing it to initialize. The mode selection logic 30 may obtain the current default output mode from the default output mode selection process 28 when it initializes. For example, if the mode selection logic 30 receives a signal from the initialization/reset process 32, it may obtain the current default output mode and, if connection to an AC power source has been detected, it may enable the continuous output mode selection process 34 and disable the pulsed output mode selection process 36. When enabled, the continuous output mode selection process 34 may select the continuous output process (e.g., FIG. 1, 14). Similarly, when enabled, the pulsed output mode selection process 36 may select the pulsed output process (e.g., FIG. 1, 16).

Figure 3:
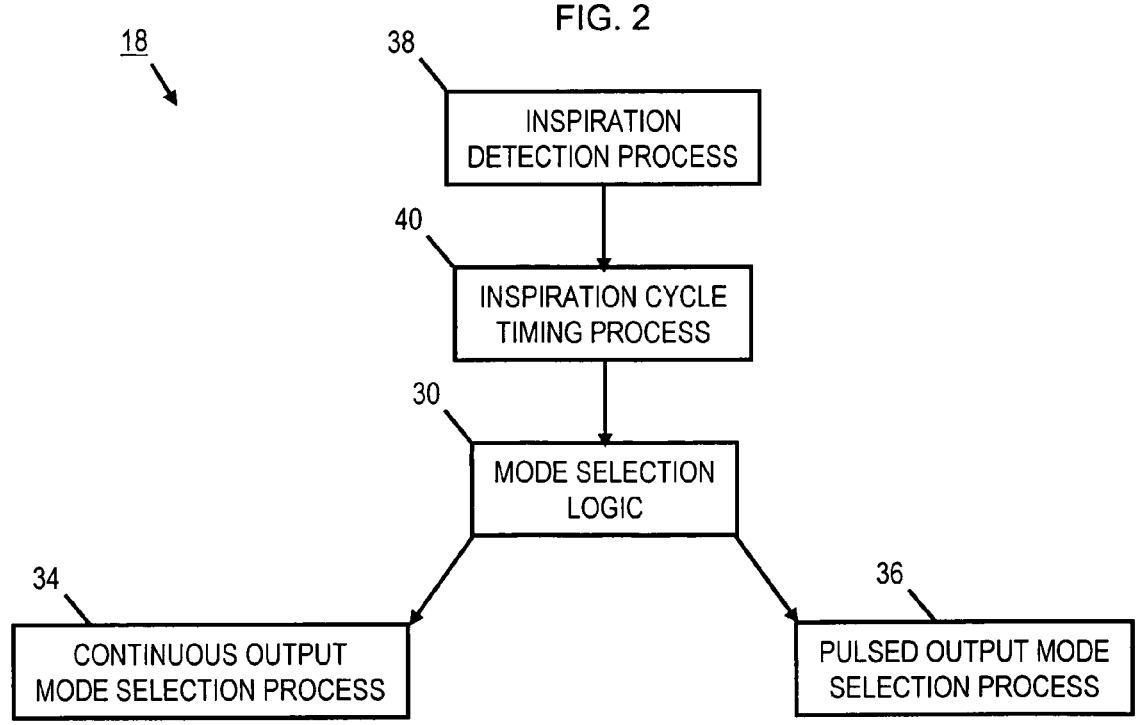
FIG. 3 is a block diagram of another exemplary embodiment of a mode selection process associated with the product gas concentrator of FIG. 1.

With reference to FIG. 3, another exemplary embodiment of the mode selection process 18 may include the mode selection logic 30, continuous output mode selection process 34, pulsed output mode selection process 36, an inspiration detection process 38, and an inspiration cycle timing process 40. The mode selection logic 30, continuous output mode selection process 34, and pulsed output mode selection process 36 may operate as describe above for FIG. 2. The inspiration detection process 38 may be adapted to detect inspiration by a user receiving the concentrated product gas in the pulsed output mode. The inspiration cycle timing process 40 may receive a signal from the inspiration detection process 38 each time an inspiration is detected. The inspiration cycle timing process 40 may operate a counter or timer. The inspiration cycle timing process 40 may associate a value from the counter with each detected inspiration and may be able to identify a time since the last detected inspiration. For example, when the time since the last detected inspiration exceeds a predetermined time, the inspiration cycle timing process 40 may send a corresponding signal to the mode selection logic 30. After the mode selection logic 30 receives this signal, it may enable the continuous output mode selection process 34.

Figure 4:
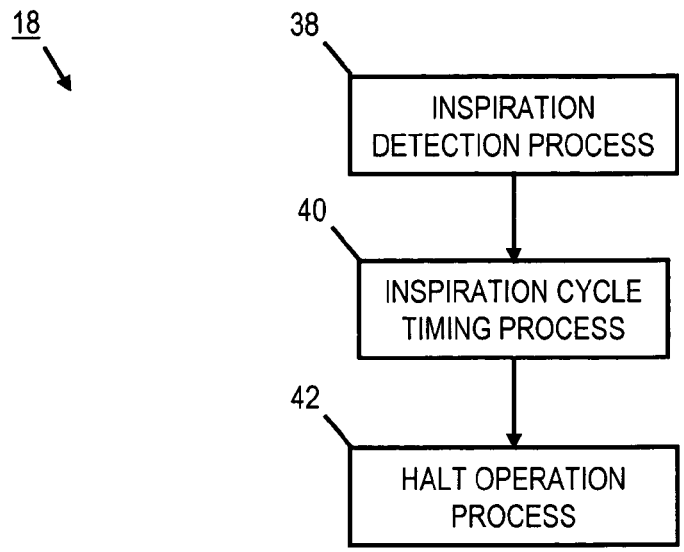
FIG. 4 is a block diagram of yet another exemplary embodiment of a mode selection process associated with the product gas concentrator of FIG. 1.

With reference to FIG. 4, yet another exemplary embodiment of the mode selection process 18 may include the inspiration detection process 38, inspiration cycle timing process 40, and a halt operation process 42. The inspiration detection process 38 and inspiration cycle timing process 40 may operate as described above for FIG. 3. However, in this embodiment, when the time since the last detected inspiration exceeds a predetermined time, the inspiration cycle timing process 40 may send the corresponding signal to the halt operation process 42. After the halt operation process 42 receives this signal, it may begin an orderly shutdown sequence that may include stoppage of the continuous or pulsed concentrated product gas (e.g., FIG. 1, 24) and powering down the product gas concentrator (e.g., FIG. 1, 10).

Figure 5:
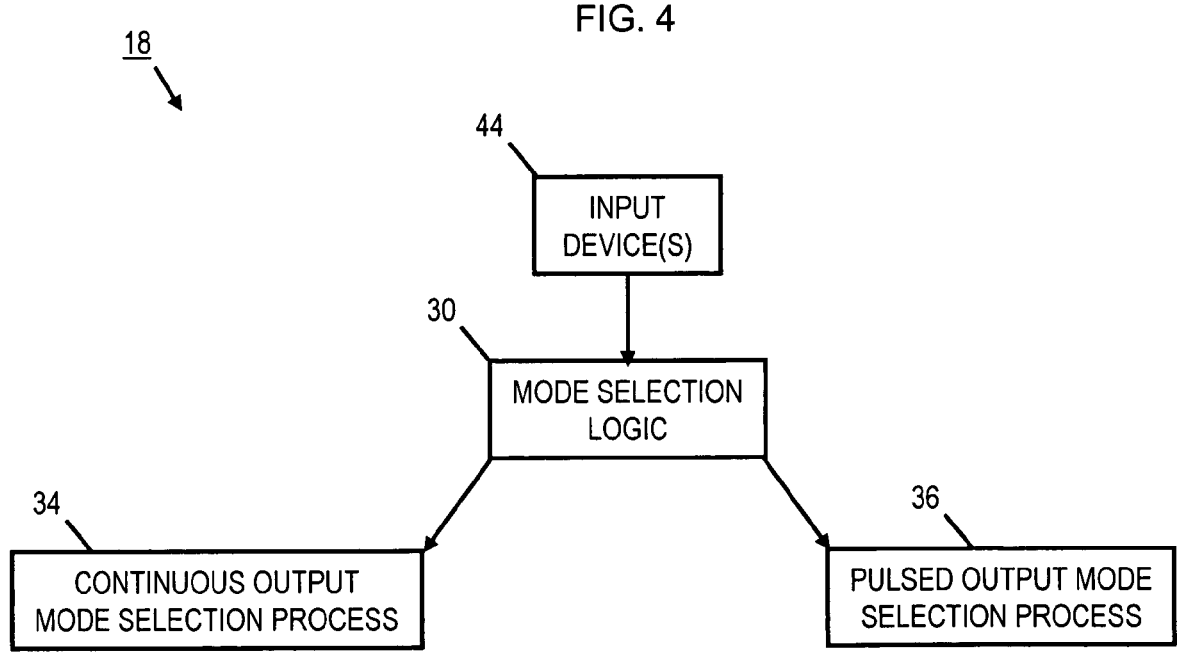
FIG. 5 is a block diagram of still another exemplary embodiment of a mode selection process associated with the product gas concentrator of FIG. 1.

With reference to FIG. 5, still another exemplary embodiment of the mode selection process 18 may include the mode selection logic 30, continuous output mode selection process 34, pulsed output mode selection process 36, and one or more input devices 44. The mode selection logic 30, continuous output mode selection process 34, and pulsed output mode selection process 36 may operate as describe above for FIG. 2. The one or more input devices 44 may include, for example, one or two momentary pushbutton switches, a latching pushbutton switch, or a two-position toggle or selector switch. Each activation of the one or more input devices 44 sends a corresponding signal to the mode selection logic 30. The mode selection logic 30 may interpret the signals in a predetermined manner to enable either the continuous output mode selection process 34 or the pulsed output mode selection process 36. For example, a first type of activation may be associated with selection of continuous output mode and a second type of activation may be associated with selection of pulsed output mode. Alternatively, a single activation may be associated with changing the current mode to the non-selected mode. For example, if the continuous output mode is currently selected, the next activation selects the pulsed output mode.

In another embodiment, a user interface that may include a display device and one or more input devices may be provided. In this embodiment, a user interface process for interacting with the display device in response to activation of the one or more input devices may also be provided. For example, the user interface process may present multiple choices in a menu, list, or graphic form on the display device for navigation and selection via the one or more input devices. A user may use the one or more input devices to interact with the display to select the continuous output mode or pulsed output mode.

Figure 6:
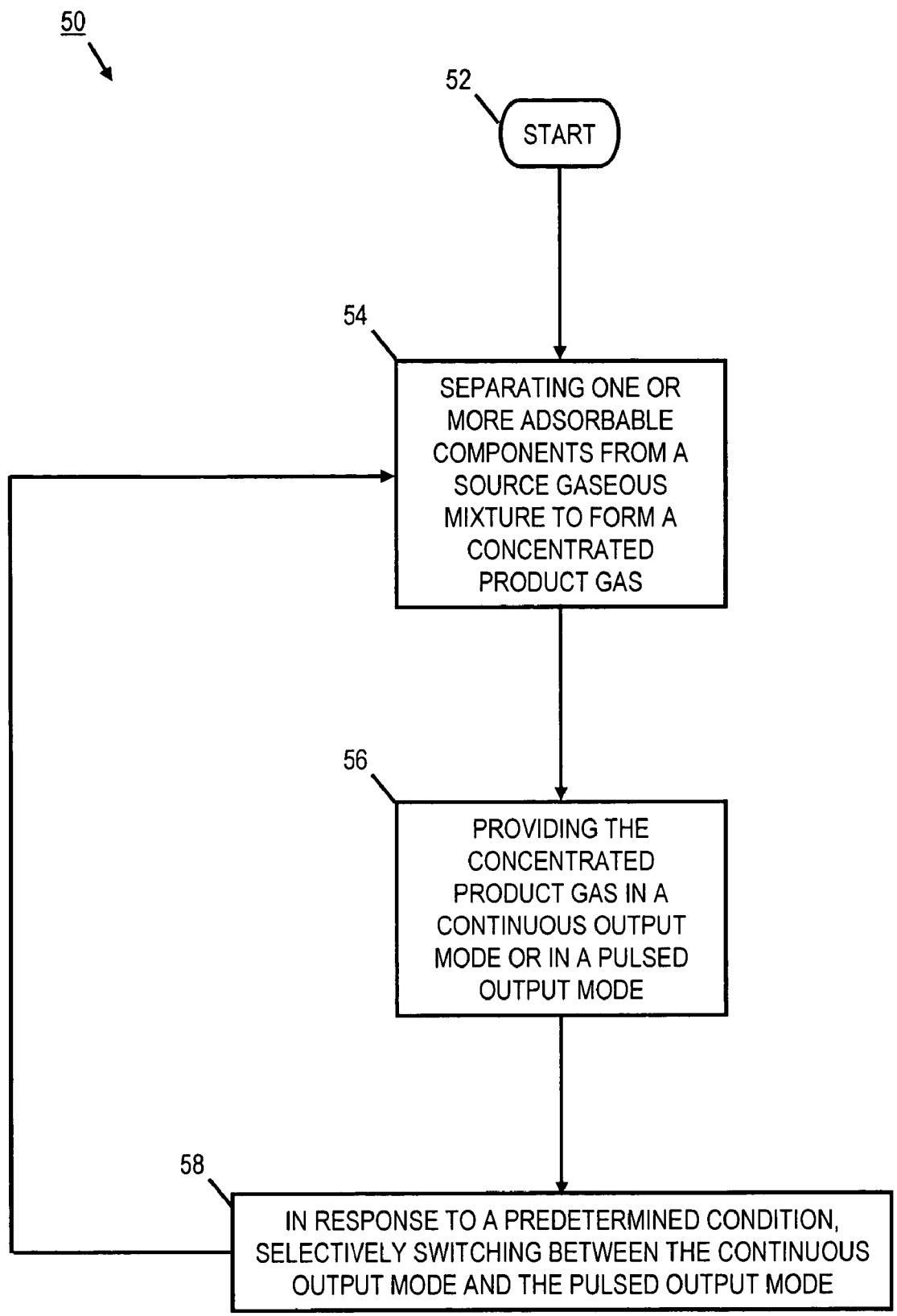
FIG. 6 is a flowchart of an exemplary embodiment of a process for providing a concentrated product gas.

With reference to FIG. 6, an exemplary embodiment of a process 50 for providing a concentrated product gas may begin at 52 when the process starts. At 54, one or more adsorbable components may be separated from a source gaseous mixture to form a concentrated product gas. Next, the concentrated product gas may be provided in a continuous output mode or in a pulsed output mode (56). At 58, in response to a predetermined condition, the process may selectively switch between the continuous output mode and the pulsed output mode. At this point, the process may be repeated.

Figure 7:
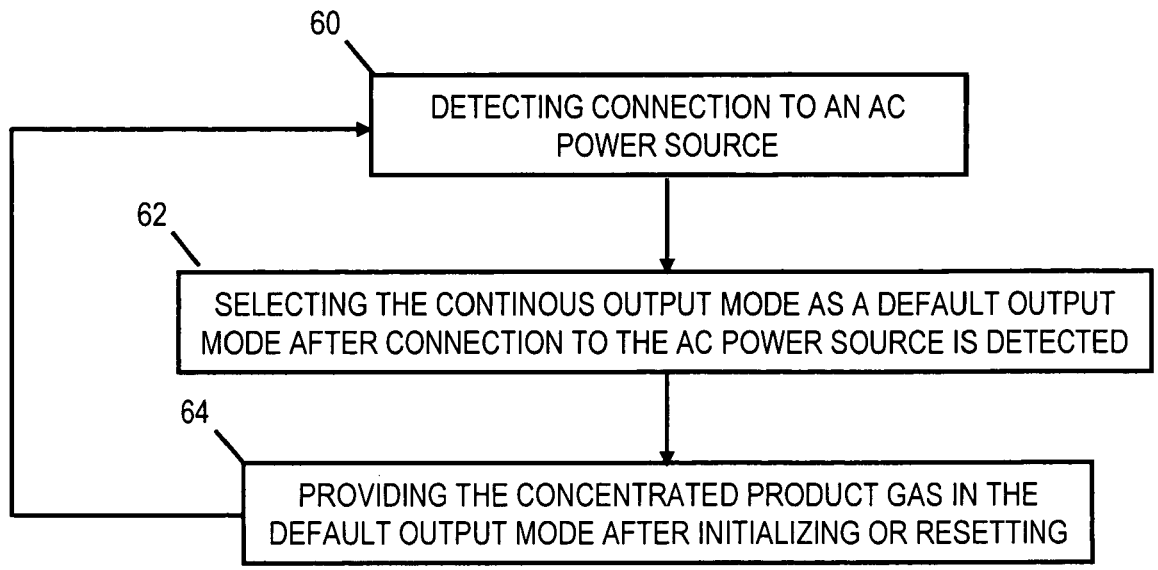
FIG. 7 is a flowchart which, in combination with FIG. 6, provides another exemplary embodiment of a process for providing a concentrated product gas.

With reference to FIG. 7, another embodiment of the exemplary process (e.g., FIG. 6, 50) for providing a concentrated product gas may include detecting connection to an AC power source (60). At 62, the continuous output mode may be selected as a default output mode after connection to the AC power source is detected. Then, the concentrated product gas may be provided in the default output mode after initializing or resetting (64). At this point, the process may be repeated.

Figure 8:
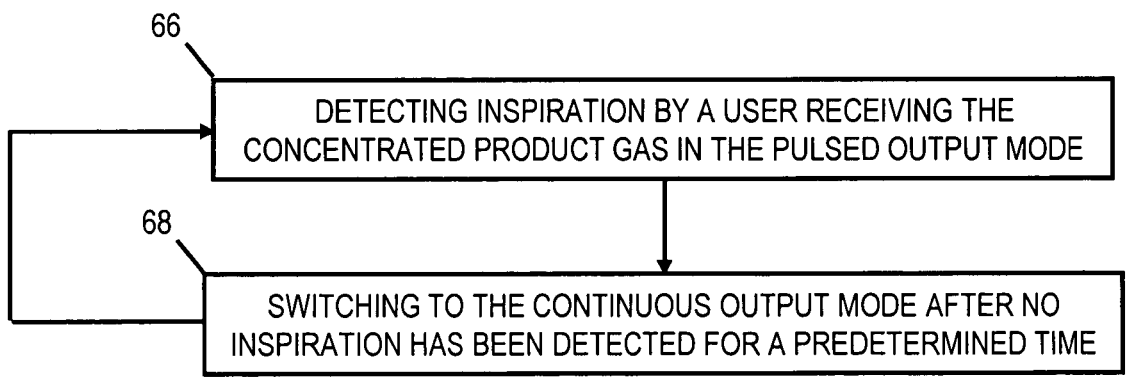
FIG. 8 is a flowchart which, in combination with FIG. 6, provides yet another exemplary embodiment of a process for providing a concentrated product gas.

With reference to FIG. 8, yet another embodiment of the exemplary process (e.g., FIG. 6, 50) for providing a concentrated product gas may include detecting inspiration by a user receiving the concentrated product gas in the pulsed output mode (66). At 68, the continuous output mode may be switched to after no inspiration has been detected for a predetermined time. At this point, the process may be repeated.

Figure 9:
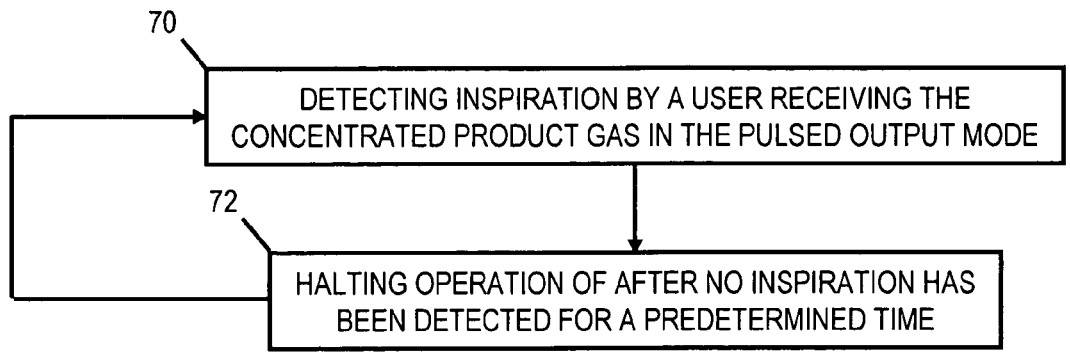
FIG. 9 is a flowchart which, in combination with FIG. 6, provides still another exemplary embodiment of a process for providing a concentrated product gas.

With reference to FIG. 9 still another embodiment of the exemplary process (e.g., FIG. 6, 50) for providing a concentrated product gas may include detecting inspiration by a user receiving the concentrated product gas in the pulsed output mode (70). At 72, operation may be halted after no inspiration has been detected for a predetermined time. At this point, the process may be repeated.

Figure 10:
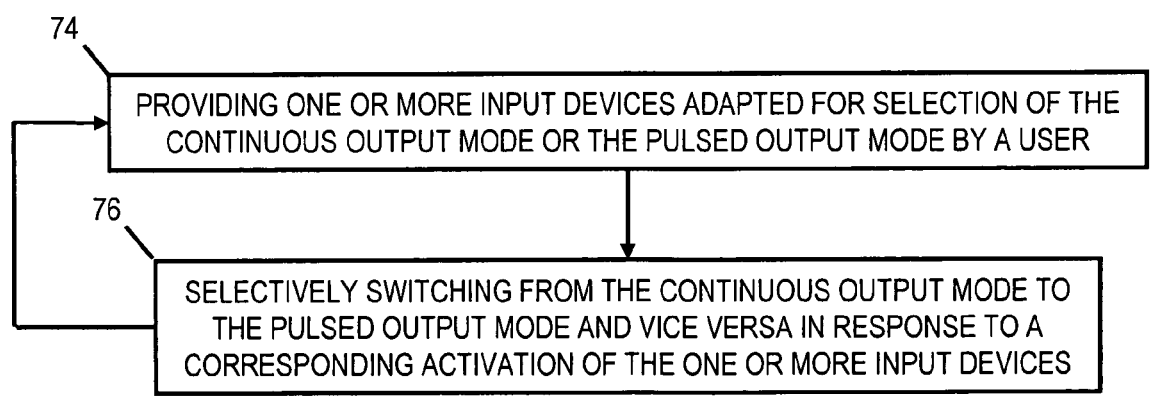
FIG. 10 is a flowchart which, in combination with FIG. 6, provides another exemplary embodiment of a process for providing a concentrated product gas.

With reference to FIG. 10, another embodiment of the exemplary process (e.g., FIG. 6, 50) for providing a concentrated product gas may include providing one or more input devices adapted for selection of the continuous output mode or the pulsed output mode by a user (74). At 76, the pulsed output mode may be selectively switched to from the continuous output mode and vice versa in response to a corresponding activation of the one or more input devices. At this point, the process may be repeated.

Figure 11:
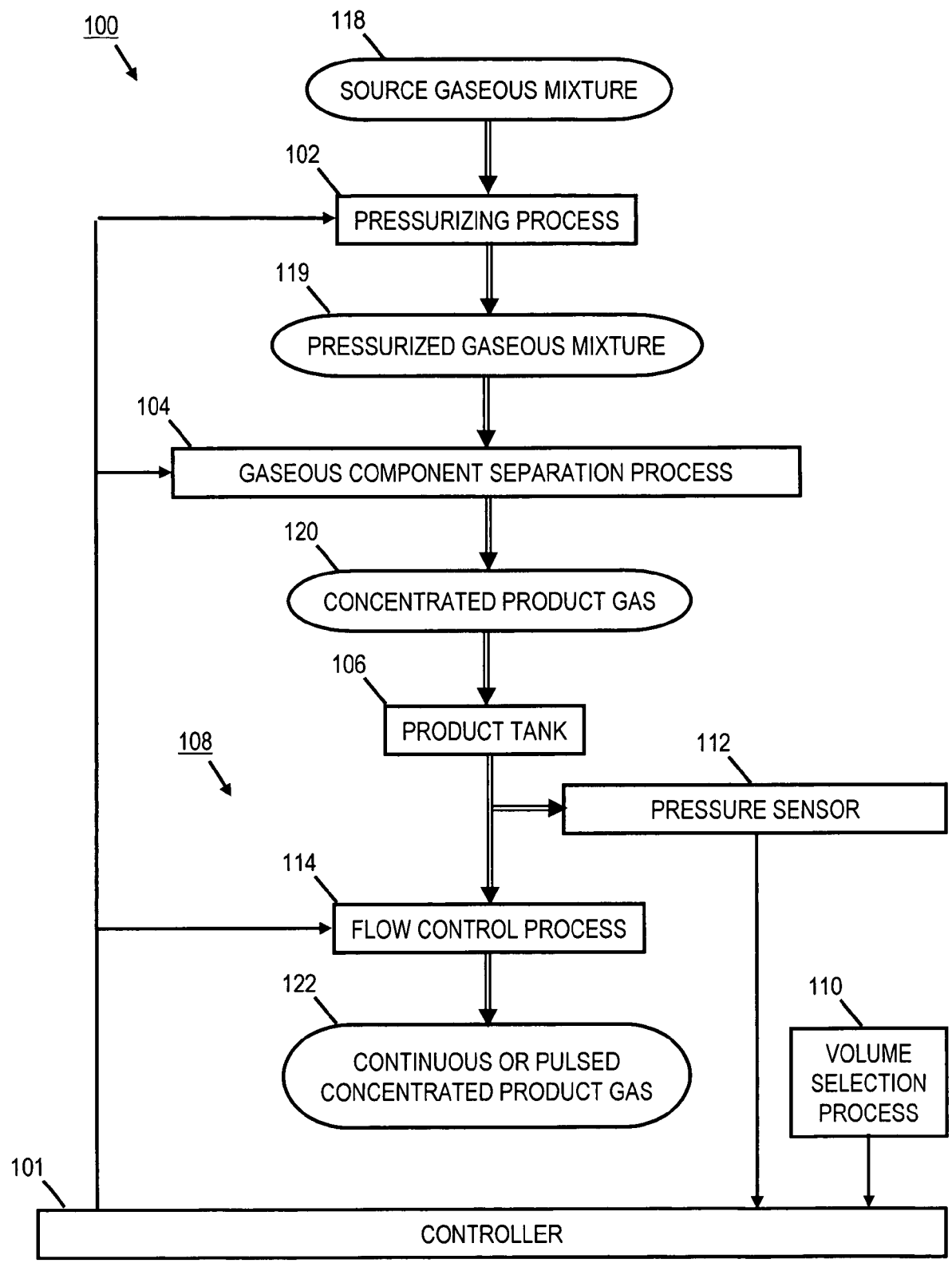
FIG. 11 is a block diagram of another exemplary embodiment of a product gas concentrator.

With reference to FIG. 11, another exemplary embodiment of a product gas concentrator 100 may include a controller 101, a pressurizing process 102, a gaseous component separation process 104, a product tank 106, an output path 108, and a volume selection process 110. The output path 108 may include a pressure sensor 112 and a flow control process 114. Generally, the product gas concentrator 100 may provide a concentrated product gas (e.g., a breathing gas with a concentration of oxygen) in either a continuous output mode or a pulsed output mode via the output path 108.

The pressurizing process 102 may be adapted to receive a source gaseous mixture 118 (e.g., atmospheric air or ambient air). The pressurizing process 102 may pressurize the source gaseous mixture 118 to form a pressurized gaseous mixture 119 that is provided to the gaseous component separation process 104. The gaseous component separation process 104 may separate one or more adsorbable components (e.g., nitrogen, carbon monoxide, carbon dioxide, water vapor, etc.) from the pressurized gaseous mixture 119 to form a concentrated product gas 120 that is provided to the product tank 106. The product tank 106 may accumulate a volume of the concentrated product gas 106. The output path 108 is in communication with the product tank 106 and may selectively dispense a continuous or pulsed concentrated product gas 122.

The volume selection process 110 may provide for selection of a volume of concentrated product gas to be dispensed via the output path 108 during a predetermined time. For example, a volume of 0.1 to 5 liters (i.e., 100 to 5,000 cubic centimeters (cc)) per minute may be selected. The volume selection process 110, for example, may include a user interface with one or more input devices. Each activation of the one or more input devices may send a corresponding signal to the controller 101. In another embodiment, the user interface may include a display device and one or more input devices. In this embodiment, the controller 101 may include a user interface process for interacting with the display device in response to activation of the one or more input devices. For example, the controller 101 may present multiple choices in a menu, list, or graphic form on the display device for navigation and selection via the one or more input devices. A user may use the one or more input devices to interact with the display to select a volume. The controller 101 may identify the selected volume from signals provided by the volume selection process 110.

The pressure sensor 112 may monitor a pressure of the concentrated product gas in the output path 108 and may provide a corresponding signal indicative of the monitored pressure to the controller 101. The controller 101 may include various processes to control the flow of the concentrated product gas through the output path 108 in response to the selected volume and the monitored pressure. In this regard, the controller 101 may control the pressurizing process 102, gaseous component separation process 104, and/or flow control process 114 in response to the selected volume and the monitored pressure.

Figure 12:
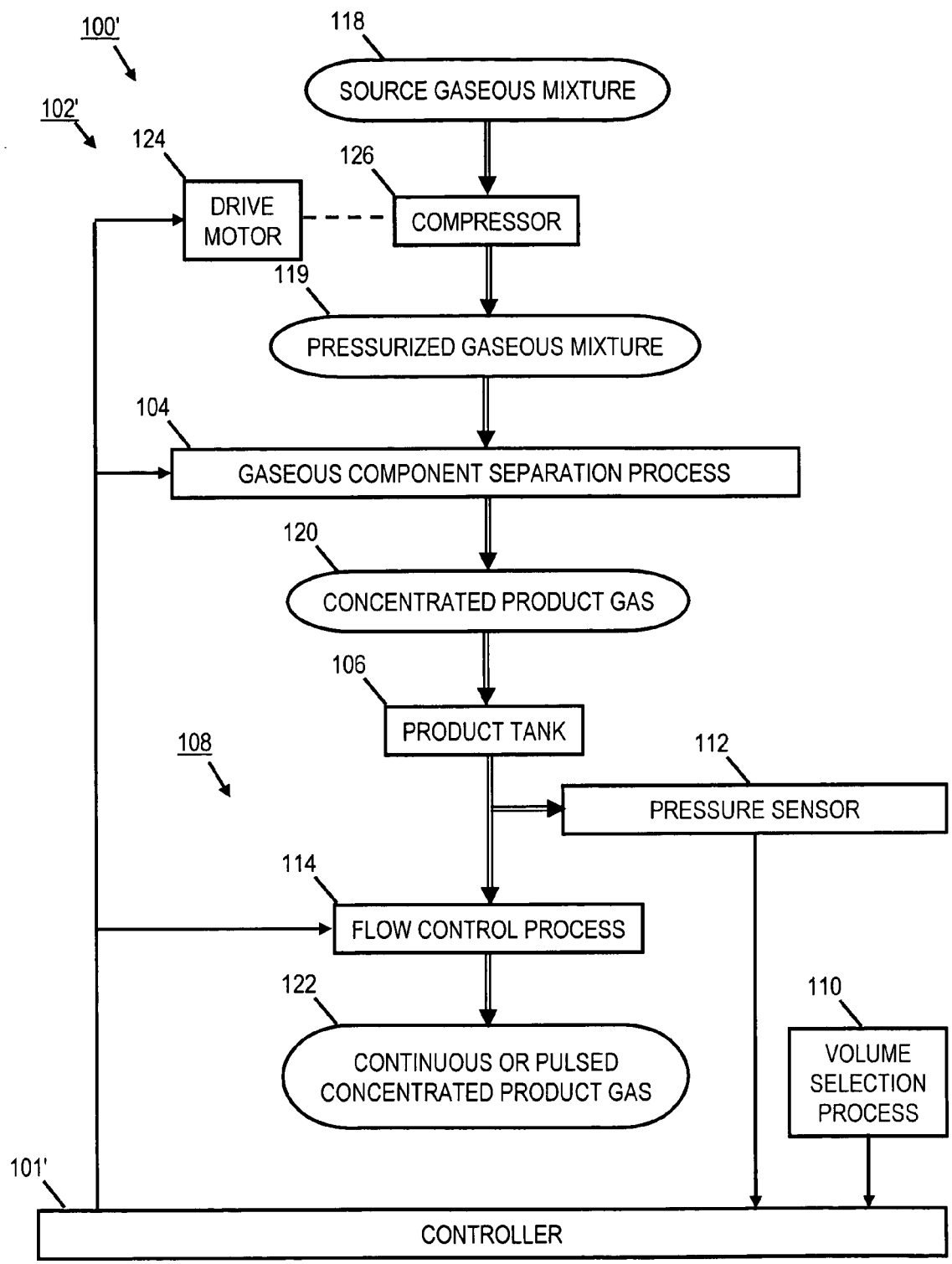
FIG. 12 is a block diagram of yet another exemplary embodiment of a product gas concentrator.

With reference to FIG. 12, yet another exemplary embodiment of a product gas concentrator 100' may include a controller 101', a pressurizing process 102', gaseous component separation process 104, product tank 106, output path 108, and volume selection process 110. The pressurizing process 102' may include a drive motor 124 and a compressor 126. The gaseous component separation process 104, product tank 106, output path 108, and volume selection process 110 may operate as described above for FIG. 11. Generally, the product gas concentrator 100' may provide a concentrated product gas (e.g., a breathing gas with a concentration of oxygen) in either a continuous output mode or a pulsed output mode via the output path 108.

In the embodiment being described, the compressor 126 is adapted to pressurize the source gaseous mixture to form the pressurized gaseous mixture. The drive motor 124 may be a variable speed motor and may drive the compressor 126 via a drive shaft. The compressor 126 may be driven directly by the drive shaft of the drive motor 124 or via another suitable type of mechanical linkage, such as a belt, gear, chain, or gear box. The controller 101' may include various processes to control the speed of the drive motor 124 in response to the selected volume and the monitored pressure. In this regard, the controller 101' may control the flow of the concentrated product gas through the output path 108, at least in part, by controlling the speed of the drive motor 124 and associated compressor 126. More specifically, the controller 101' may include an initial motor process for initially operating the variable speed drive motor 124 at a speed corresponding to the selected volume. The controller 101' may also include a motor adjustment process for adjusting the speed of the variable speed drive motor 124 in response to at least one of the monitored pressure and the selected volume.

Figure 13:
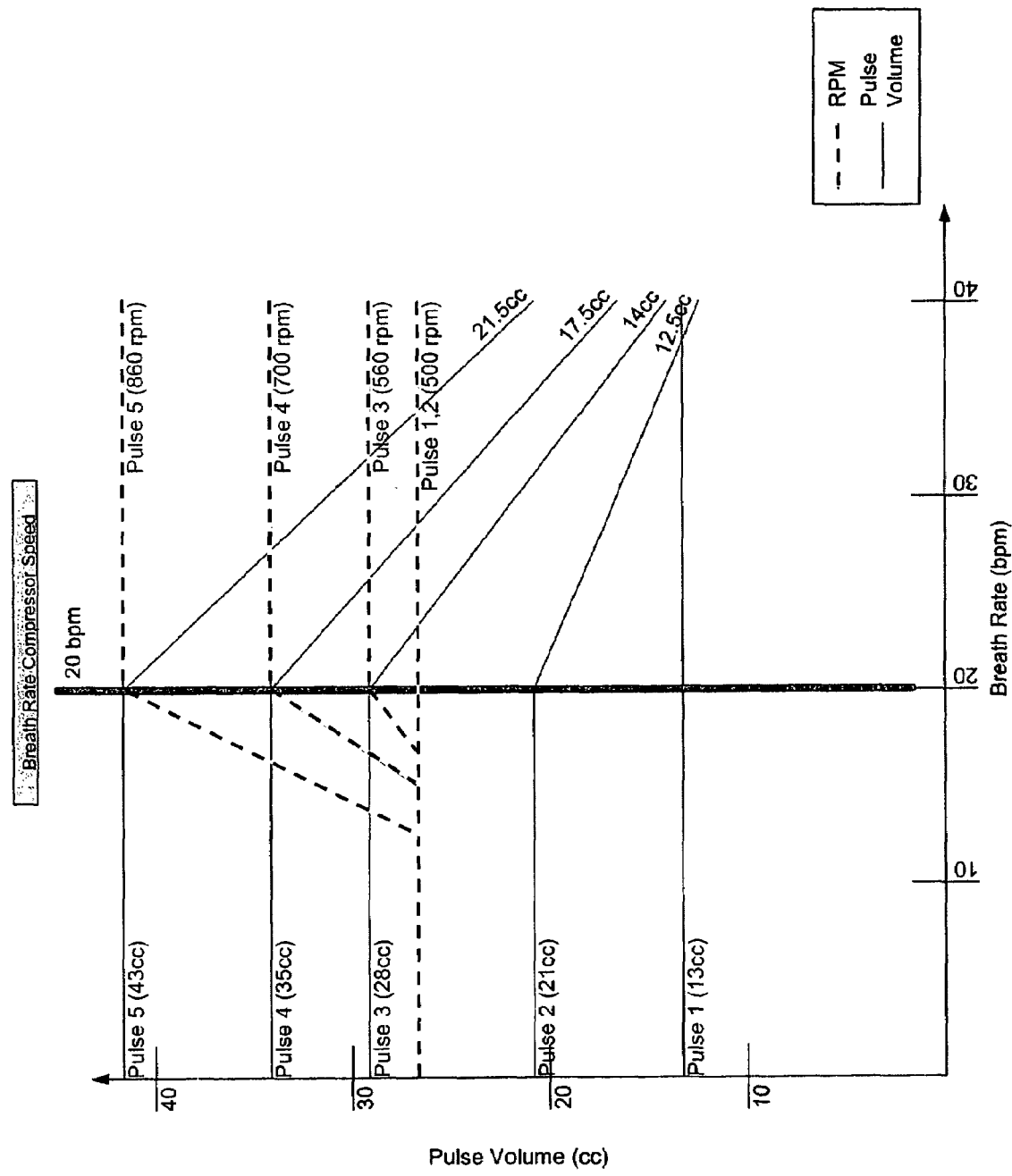
FIG. 13 is a graph relating pulse volume, breath rate, and compressor speed for an exemplary embodiment of a product gas concentrator operating in a pulsed output mode.

With reference to FIG. 13, a graph relates pulse volume, breath rate, and compressor speed parameters for an exemplary embodiment of a product gas concentrator operating in a pulsed output mode. In this embodiment, the product gas concentrator may, for example, select between five different pulse volumes (i.e., 13 cc, 21 cc, 28 cc, 35 cc, and 43 cc). In this example, for breath rates up to 20 breaths per minute (bpm), the pulse volume may be held constant. However, as breath rates increase beyond 20 bpm, the pulse volume may be decreased while providing sufficient volume over time in relation to the volume provided at 20 bpm. For example, at 40 bpm, the five pulse volumes may be 13, 12.5, 14, 17.5, and 21.5. The graph also shows general guidelines by which the product gas concentrator may vary the speed of a compressor pressurizing the source gaseous mixture in response to varying breath rates by a user receiving pulsed concentrated product gas. As shown, different guidelines may be used for different pulse volumes. The guidelines reflect that the compressor may be initially operated at 500 revolutions per minute (rpm) for each of the pulse volumes. The compressor speed for the 13 and 21 cc pulse volumes may remain at 500 rpm regardless of the breath rate. However, the compressor speed for the 28, 35, and 43 cc pulse volumes begins to ramp up as the breath rate increases at different points between 10 and 20 bpm. The compressor speed for the 28 cc pulse volume ramps up to 560 rpm and remains at that speed as long as the breath rate is 20 bpm or greater. The compressor speed for the 35 cc pulse volume ramps up to 700 rpm and remains at that speed as long as the breath rate is 20 bpm or greater. The compressor speed for the 43 cc pulse volume ramps up to 860 rpm and remains at that speed as long as the breath rate is 20 bpm or greater.

Figure 14:
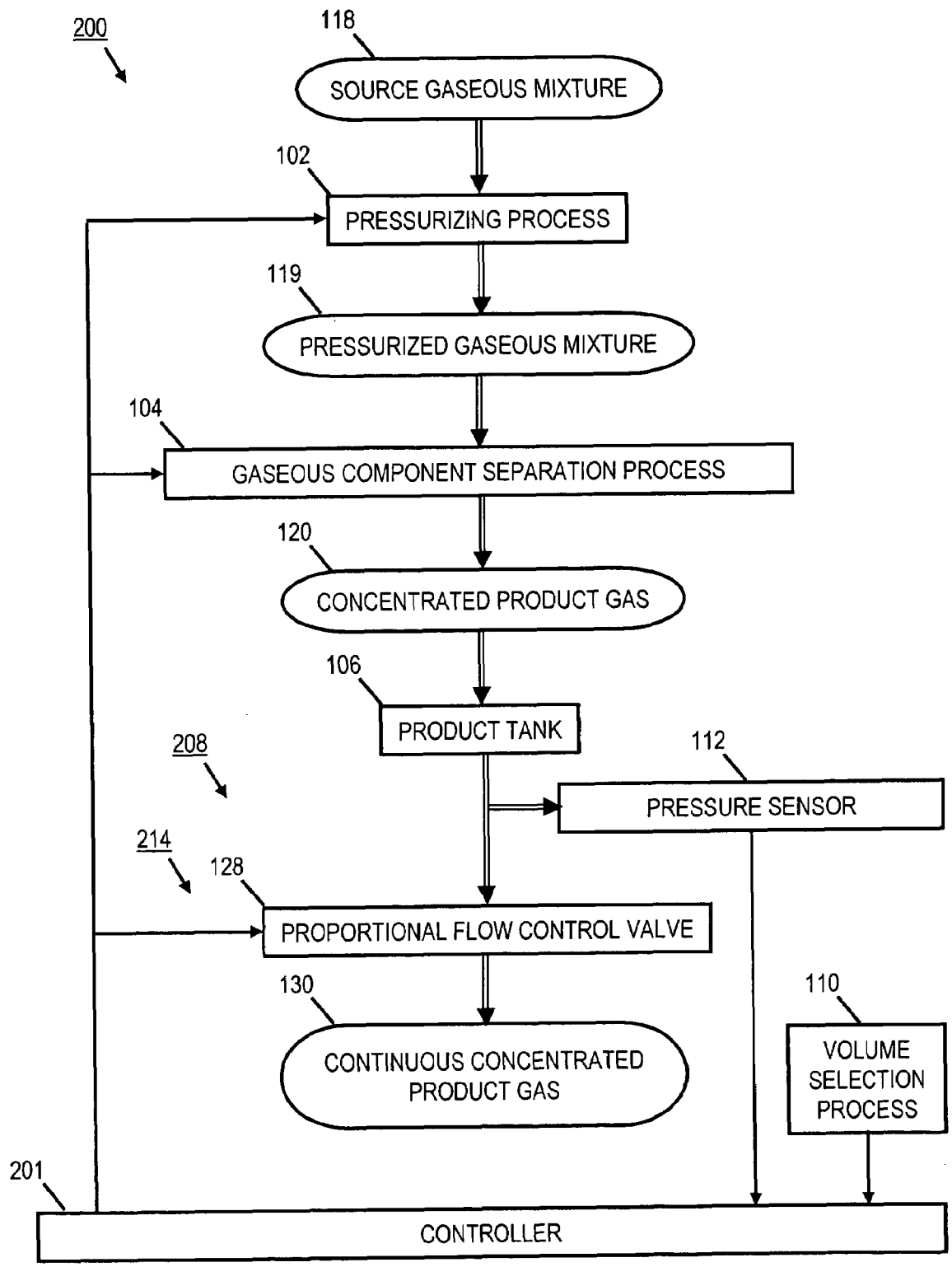
FIG. 14 is a block diagram of an exemplary embodiment of a product gas concentrator operating in a continuous output mode.

With reference to FIG. 14, an exemplary embodiment of a product gas concentrator 200 operating in a continuous output mode may include the pressurizing process 102, gaseous component separation process 104, product tank 106, volume selection process 110, a controller 201, and an output path 208. The output path 208 may include the pressure sensor 112 and a flow control process 214. The flow control process 214 may include a proportional flow control valve 128. The pressurizing process 102, gaseous component separation process 104, product tank 106, volume selection process 110, and pressure sensor 112 may operate as described above for FIG. 11. Generally, the product gas concentrator 200 may provide a continuous concentrated product gas 130 (e.g., a breathing gas with a concentration of oxygen) via the output path 208.

The proportional flow control valve 128 is adapted to proportionately move between a closed position and an open position in relation to a variable control signal from the controller 201. The controller 201 may include various processes to control the level of the variable control signal and the corresponding position of the proportional flow control valve 128 in response to the selected volume and the monitored pressure. In cooperation with the proportional flow control valve 128, the monitored pressure from the pressure sensor 112 may be related to flow through the output path 208 by the controller 201. Further, the controller 201 may relate flow through the output path 208 to volume, for example, with respect to continuous flow over a know time. In this regard, the controller 201 may control the flow of the continuous concentrated product gas 130 through the output path 208, at least in part, by controlling the proportional flow control valve 128. More specifically, the controller 201 may include an initial proportional valve process for initially moving the proportional flow control valve 128 to a position corresponding to the selected volume. The controller 201 may also include a proportional valve adjustment process for adjusting the position of the proportional flow control valve 128 in response to at least one of the monitored pressure and the selected volume.

Figure 15:
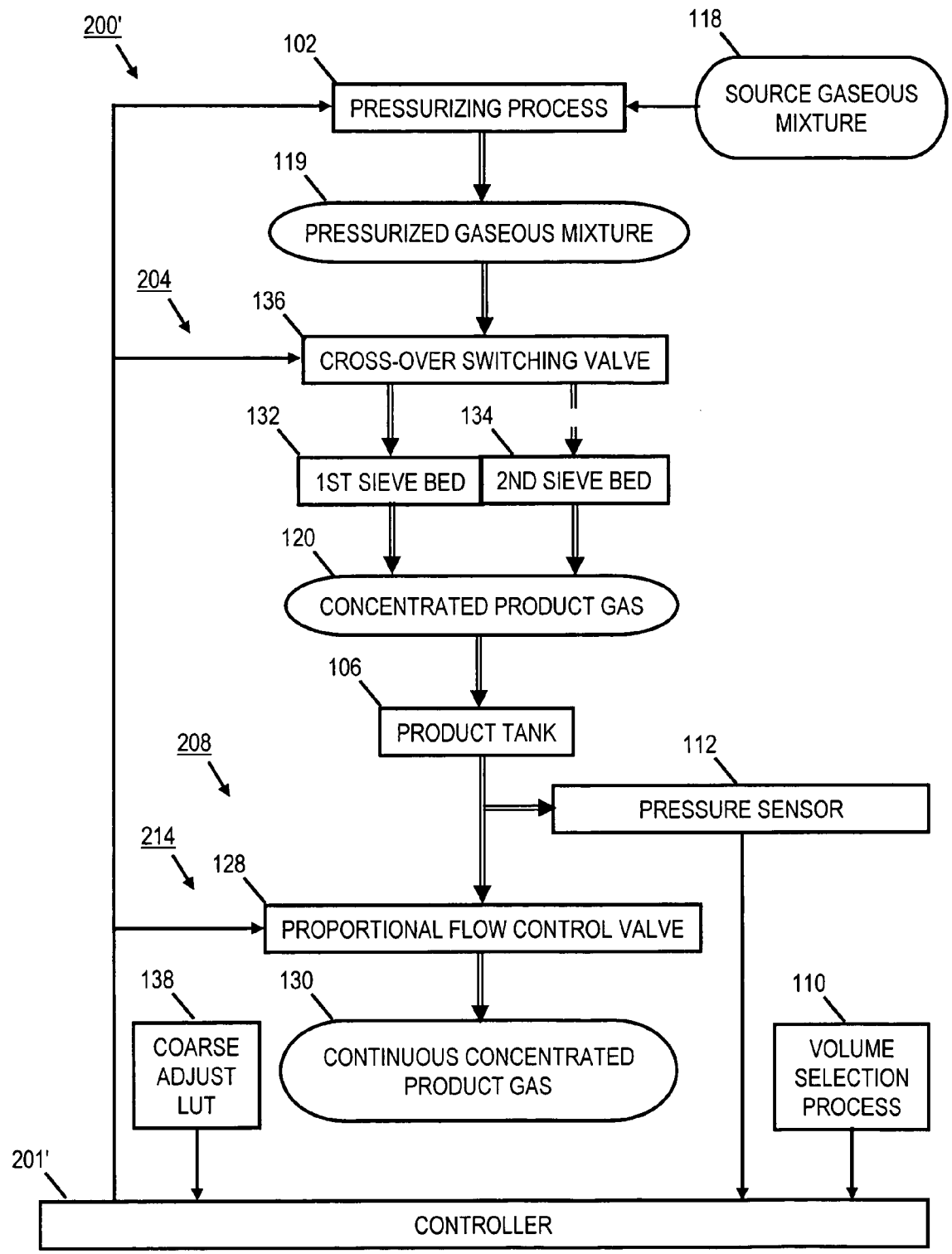
FIG. 15 is a block diagram of another exemplary embodiment of a product gas concentrator operating in a continuous output mode.

With reference to FIG. 15, another exemplary embodiment of a product gas concentrator 200' operating in a continuous output mode may include the pressurizing process 102, product tank 106, volume selection process 110, a coarse adjust lookup table (LUT) 138, output path 208, a controller 201', and a gaseous component separation process 204. The output path 208 may include the pressure sensor 112 and flow control process 214. The flow control process 214 may include the proportional flow control valve 128. The gaseous component separation process 204 may include first and second sieve beds 132, 134 and a cross-over switching valve 136. The pressurizing process 102, product tank 106, volume selection process 110, and pressure sensor 112 may operate as described above for FIG. 11. The output path 208, flow control process 214, and proportional flow control valve 128 may operate as described above for FIG. 14. Generally, the product gas concentrator 200' may provide a continuous concentrated product gas 130 (e.g., a breathing gas with a concentration of oxygen) via the output path 208.

The first and second sieve beds 132, 134, each may be adapted to receive the pressurized gaseous mixture 119, separate the one or more adsorbable components from the pressurized gaseous mixture 119, and provide the concentrated product gas 120 to the product tank 106. The sieve beds, for example, may operate similar to sieve beds disclosed in U.S. Pat. Nos. 4,449,990, 5,906,672, 5,917,135, and 5,988,165 which are commonly assigned to Invacare Corporation of Elyria, Ohio and fully incorporated herein by reference. The cross-over switching valve 136 is adapted to selectively switch between a first position, for example, connecting the pressurized gaseous mixture 119 to the first sieve bed 132 and a second position, for example, connecting the pressurized gaseous mixture 119 to the second sieve bed 134. As shown, the cross-over switching valve 136 is in the first position.

The controller 201' may include various processes to control the cross-over switching valve 136 and proportional flow control valve 128 in response to the selected volume and the monitored pressure. In this regard, the controller 201' may control the flow of the continuous concentrated product gas 130 through the output path 208, at least in part, by controlling the cross-over switching valve 136 and/or proportional flow control valve 128. More specifically, the controller 201' may include an initial proportional valve process for initially moving the proportional flow control valve 128 to a position corresponding to the selected volume. The controller 201' may also include a proportional valve adjustment process for adjusting the position of the proportional flow control valve 128 in response to at least one of the monitored pressure and the selected volume.

In cooperation with the proportional valve adjustment process, the controller 201' may include a cross-over valve process to periodically change the cross-over switching valve 136 between the first and second positions to define a separating cycle associated with the gaseous component separation process 204. The separating cycle may include a first portion in which the first sieve bed 132 receives the pressurized gaseous mixture 119 and a second portion in which the second sieve bed 134 receives the pressurized gaseous mixture 119.

The first portion may include a first segment in which the first sieve bed 136 separates the one or more adsorbable components from the pressurized gaseous mixture 119 and a second segment in which the first sieve bed 136 continues separating the one or more adsorbable components from the pressurized gaseous mixture 119 and also provides the concentrated product gas 120 to the product tank 106. For example, the path between the gaseous component separation process 204 and product tank 106 may include a directional component, such as a check valve. The directional component may permit the concentrated product gas 120 to flow into the product tank 106 when a pressure on the separation process side of the directional component is greater than the pressure on the product tank side, but blocks flow of the concentrated product gas 120 from the product tank 106 to the separation process side when the pressure on the separation process side is less than the pressure on the product tank side. The first segment of the first portion of the separating cycle relates to conditions when flow of concentrated product gas 120 from the product tank 106 to the first sieve bed 132 is blocked. The second segment relates to conditions when concentrated product gas 120 flows from the first sieve bed 132 to the product tank 106.

Similarly, the second portion of the separating cycle may include a third segment in which the second sieve bed 134 separates the one or more adsorbable components from the pressurized gaseous mixture 119 and a fourth segment in which the second sieve bed 134 continues separating the one or more adsorbable components from the pressurized gaseous mixture 119 and also provides the concentrated product gas 120 to the product tank 106. Like for the first sieve bed 132, the path between the second sieve bed 134 and product tank 106 may include a directional component, such as a check valve. Thus, the third segment of the separating cycle relates to conditions when flow of concentrated product gas 120 from the product tank 106 to the second sieve bed 134 is blocked. Additionally, the fourth segment relates to conditions when concentrated product gas 120 flows from the second sieve bed 134 to the product tank 106.

In conjunction with the operation of the gaseous component separation process 204 described above, the controller 201' may include a pressure decay process, a volume dispensed process, a coarse adjustment determining process, and a proportional valve coarse adjustment process. The pressure decay process may include comparing a first monitored pressure associated with a transition from the first portion of the separating cycle to the second portion with a second monitored pressure taken during the third segment of the separating cycle and identifying a first pressure decay in the output path 208 associated with at least a portion of the third segment. The volume dispensed process may include determining a first volume of continuous concentrated product gas 130 dispensed from the output path 208 in relation to the first pressure decay. The coarse adjustment determining process may include comparing the first volume to the selected volume in relation to a known time between the first and second monitored pressures to determine a first coarse adjustment associated with a current level of the variable control signal to the proportional flow control valve 128. The proportional valve coarse adjustment process may include changing the current level of the variable control signal to the proportional flow control valve 128 in relation to the first coarse adjustment.

The controller 201' may also use the pressure decay process, volume dispensed process, coarse adjustment determining process, and proportional valve coarse adjustment process described above to make another coarse adjustment associated with a transition from the second portion of the separating cycle to the first portion of a next separating cycle. This coarse adjustment is based on a second pressure decay in the output path 208 associated with at least a portion of the first segment of the next separating cycle.

The coarse adjust LUT 138 may include lookup values for certain parameters related to certain corresponding measured and/or determined values of certain other parameters. For example, the coarse adjust LUT 138 may include lookup values for the variable control signal related to corresponding values associated with a difference between the actual volume dispensed (e.g., first volume) and the selected volume. In other embodiments, the coarse adjust LUT 138 may include lookup values for monitored pressure related to corresponding values associated with the signal from the pressure sensor 112, lookup values for an actual volume dispensed (e.g., first volume) related to corresponding values for a pressure decay (e.g., first pressure decay), and/or lookup values for the variable control signal related to corresponding values associated with the selected volume. The controller 201' may retrieve lookup values from the coarse adjust LUT 138 in conjunction with the various processes controlling the flow of the continuous concentrated product gas 130 through the output path 208.

Figure 16:
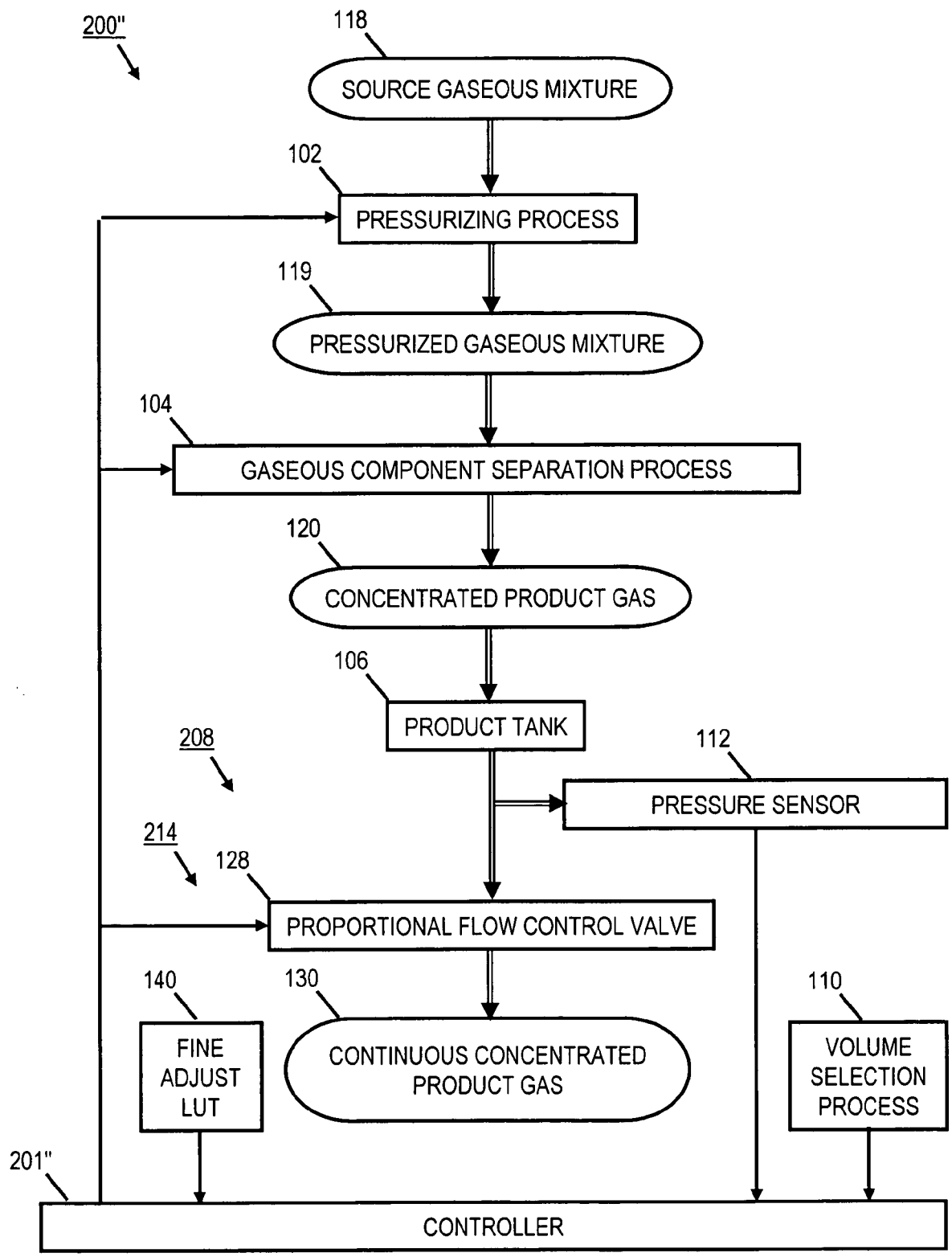
FIG. 16 is a block diagram of yet another exemplary embodiment of a product gas concentrator operating in a continuous output mode.

With reference to FIG. 16, yet another exemplary embodiment of a product gas concentrator 200" operating in a continuous output mode may include the pressurizing process 102, gaseous component separation process 104, product tank 106, volume selection process 110, output path 208, a fine adjust LUT 140, and a controller 201". The output path 208 may include the pressure sensor 112 and flow control process 214. The flow control process 214 may include the proportional flow control valve 128. The pressurizing process 102, gaseous component separation process 104, product tank 106, volume selection process 110, and pressure sensor 112 may operate as described above for FIG. 11. The output path 208, flow control process 214, and proportional flow control valve 128 may operate as described above for FIG. 14. Generally, the product gas concentrator 200" may provide a continuous concentrated product gas 130 (e.g., a breathing gas with a concentration of oxygen) via the output path 208.

The controller 201" may include various processes to control the level of the variable control signal and the corresponding position of the proportional flow control valve 128 in response to the selected volume and the monitored pressure. In this regard, the controller 201" may control the flow of the continuous concentrated product gas 130 through the output path 208, at least in part, by controlling the proportional flow control valve 128. More specifically, the controller 201" may include an initial proportional valve process for initially moving the proportional flow control valve 128 to a position corresponding to the selected volume. The controller 201" may also include a proportional valve adjustment process for adjusting the position of the proportional flow control valve 128 in response to at least one of the monitored pressure and the selected volume.

In cooperation with the proportional valve adjustment process, the controller 201" may include an expected pressure process, a fine adjustment determining process, and a proportional valve fine adjustment process. The expected pressure process may include identifying an expected average pressure for the concentrated product gas 120 in the output path 208 during continuous output mode in relation to the selected volume. The fine adjustment determining process may include periodically comparing a current monitored pressure to the expected average pressure to identify a current fine adjustment associated with a current level of the variable control signal to the proportional flow control valve 128. In another embodiment, the current fine adjustment may be identified as a predetermined percentage or factor of the current monitored pressure. The proportional valve fine adjustment process may include changing the current level of the variable control signal to the proportional flow control valve 128 in relation to the current fine adjustment.

The fine adjust LUT 140 may include lookup values for certain parameters related to certain corresponding measured and/or determined values of certain other parameters. For example, the fine adjust LUT 140 may include lookup values for the variable control signal related to corresponding values associated with a difference between the monitored pressure and the expected average pressure. In other embodiments, the fine adjust LUT 140 may include lookup values for monitored pressure related to corresponding values associated with the signal from the pressure sensor 112, lookup values for the average expected pressure related to corresponding values for the selected volume, and/or lookup values for the variable control signal related to corresponding values associated with the selected volume. The controller 201" may retrieve lookup values from the fine adjust LUT 140 in conjunction with the various processes controlling the flow of the continuous concentrated product gas 130 through the output path 208.

Figure 17:
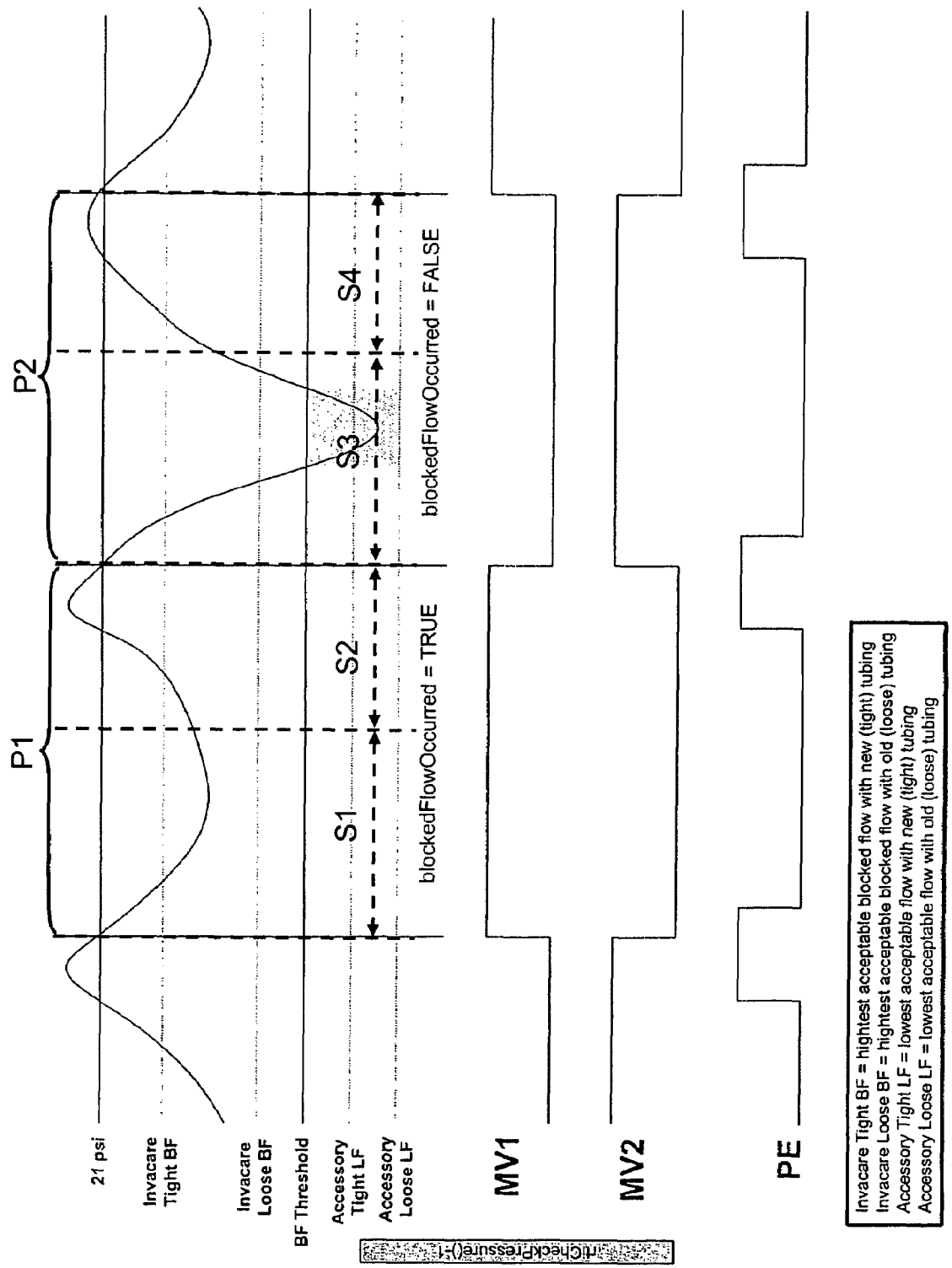
FIG. 17 is a graph relating concentrated product gas pressure and sieve bed operation for an exemplary embodiment of a product gas concentrator operating in a continuous output mode.

With reference to FIG. 17, a graph relating concentrated product gas pressure and sieve bed operation for an exemplary embodiment of a product gas concentrator (e.g., FIG. 15, 200') operating in a continuous output mode is provided. The monitored pressure of the concentrated product gas (e.g., FIG. 15, 120) is shown in the saw tooth-like waveform. The MV1 and MV2 waveforms reflect operation of the first and second sieve beds (e.g., FIG. 15, 132, 134), respectively. The alternate operation of the first and second sieve beds described above for FIG. 15 is shown by the opposite levels in the MV1 and MV2 signals. For example, the first sieve bed may receive the pressurized gaseous mixture (e.g., FIG. 15, 119) and may form the concentrated product gas (e.g., FIG. 15, 120) when the MV1 signal is high. Similarly, the second sieve bed may receive the pressurized gaseous mixture and may form the concentrated product gas when the MV2 signal is high. As mentioned above, each consecutive operation of the first and second sieve beds may be referred to as a separating cycle. As described above in more detail, each separating cycle may include a first portion P1 associated with the first sieve bed and a second portion P2 associated with the second sieve bed. Likewise, as described above in more detail, each separating cycle may include first and second segments S1, S2 associated with the first portion P1 and third and fourth segments S3, S4 associated with the second portion P2. The PE waveform reflects operation of a pressure equalization (PE) valve between the outputs of the first and second sieve beds. The pulse on the PE waveform shows that the PE valve is activated in conjunction with transitions between operation of the first and second sieve beds. Operation of the PE valve is described in more detail below (e.g., see FIG. 29).

Figure 18:
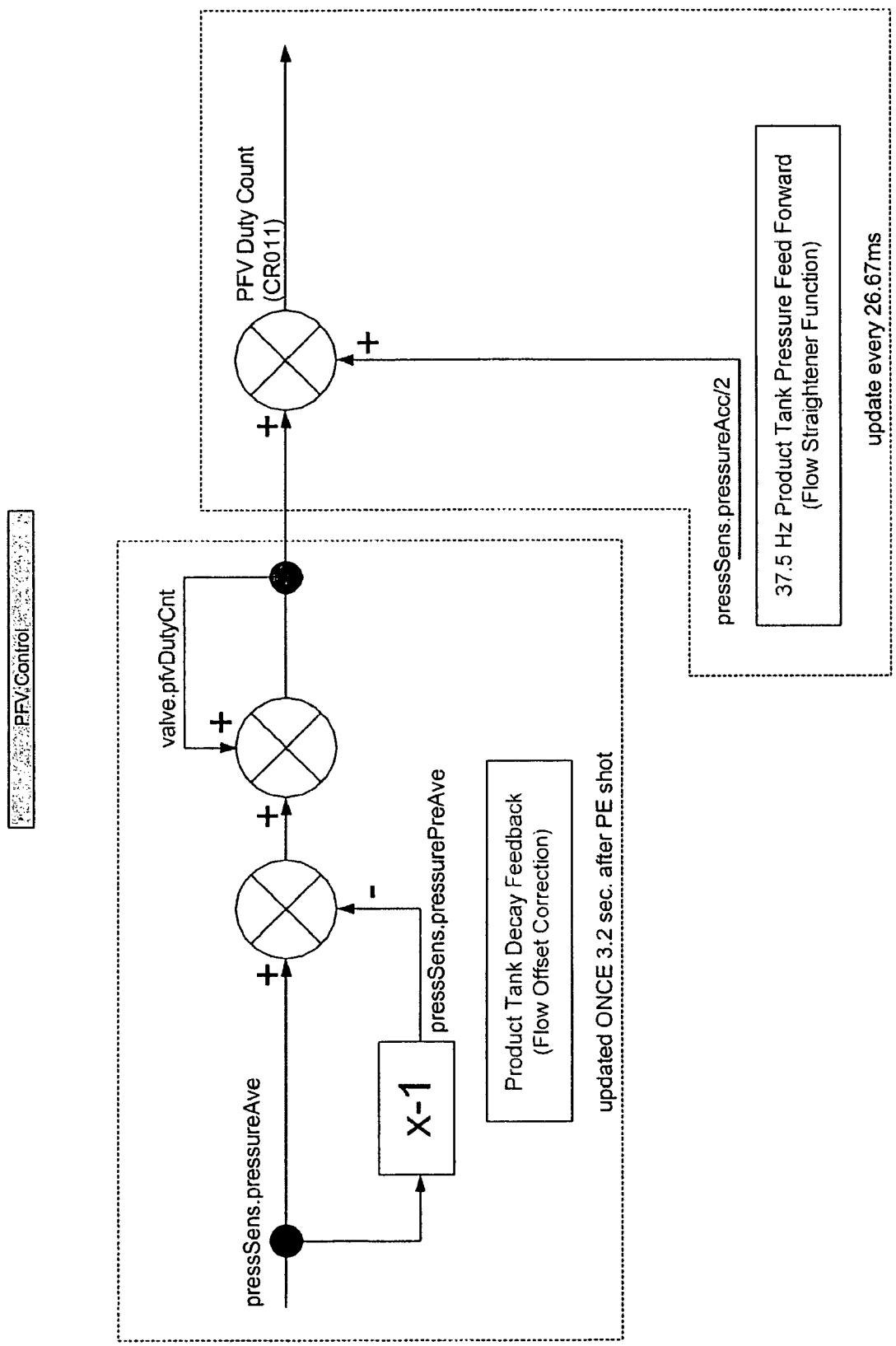
FIG. 18 is an exemplary algorithm for controlling a proportional flow control valve in an exemplary embodiment of a product gas concentrator operating in a continuous output mode.

With reference to FIG. 18, an exemplary algorithm for controlling a proportional flow control valve (e.g., FIGS. 15 and 16, 128) in an exemplary embodiment of a product gas concentrator (e.g., FIG. 15, 200' and FIG. 16, 200") operating in a continuous output mode is presented. The "Decay Feedback" portion of the exemplary algorithm may be used to make coarse adjustments of the variable control signal to the proportional flow control valve based on pressure decay as described above in more detail (see FIG. 15). As shown, the coarse adjustment may be based on closed-loop control of the proportional flow control valve with respect to periodically monitored pressure in relation to selected volume. The coarse adjustment may be repeated in relation to the separating cycle associated with operation of the first and second sieve beds (e.g., FIG. 15, 132, 134). For example, the coarse adjustment may be performed during the third segment (e.g., FIG. 17, S3) and approximately 3.2 seconds after the start of the second portion (e.g., FIG. 17, P2) of the separating cycle. The coarse adjustment may also be performed during the first segment (e.g., FIG. 17, S1) and approximately 3.2 seconds after the start of the first portion (e.g., FIG. 17, P1) of the separating cycle. The coarse adjustment may provide a flow offset function for the continuous flow mode.

The "Feed Forward" portion of the exemplary algorithm may be used to make fine adjustments of the variable control signal to the proportional flow control valve based on current pressure as described above in more detail (see FIG. 16). As shown, the fine adjustment may be based on open-loop control of the proportional flow control valve with respect to periodically monitored pressure. The fine adjustment may be repeated during operation of the product gas concentrator in the continuous output mode. For example, the fine adjustment may be performed every 26.67 milliseconds (ms). The fine adjustment may provide a flow straightening function for the continuous flow mode.

Figure 19:
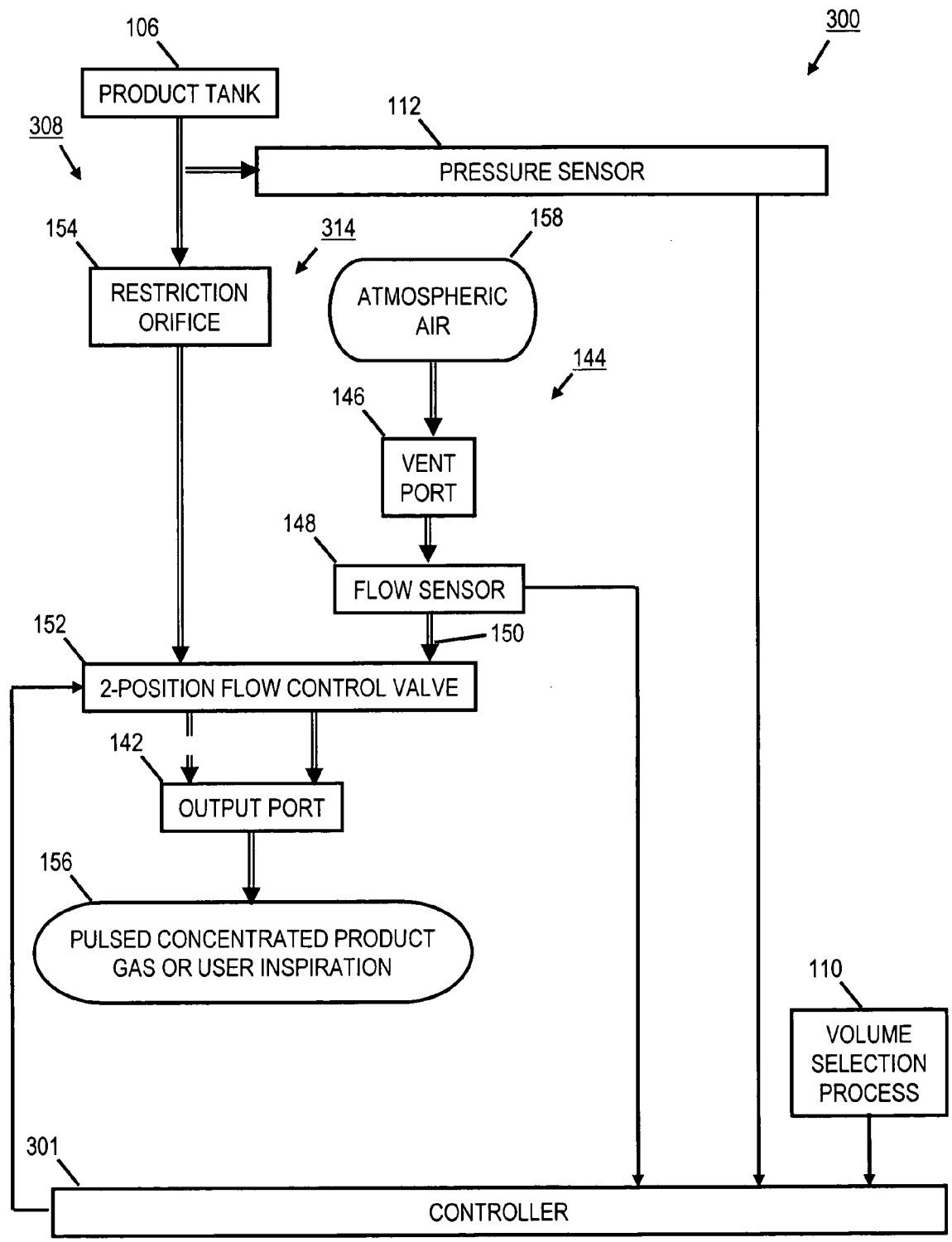
FIG. 19 is a block diagram which, in combination with an input portion of FIG. 11, provides an exemplary embodiment of a product gas concentrator operating in a pulsed output mode.

With reference to FIGS. 19 and 11, an exemplary embodiment of a product gas concentrator 300 operating in a pulsed output mode may include the pressurizing process 102, gaseous component separation process 104, product tank 106, volume selection process 110, a controller 301, and an output path 308. The output path 308 may include the pressure sensor 112, an output port 142, an inspiration path 144, and a flow control process 314. The inspiration path 144 may include a vent port 146, a flow sensor 148, and an outlet end 150. The flow control process 314 may include a two-position flow control valve 152 and a restriction orifice 154. The pressurizing process 102, gaseous component separation process 104, product tank 106, volume selection process 110, and pressure sensor 112 may operate as describe above for FIG. 11. Generally, the product gas concentrator 300 may provide a pulsed concentrated product gas 156 (e.g., a breathing gas with a concentration of oxygen) via the output path 308.

The output port 142 may be adapted to provide pulsed concentrated product gas 156 to a user. The vent port may be adapted to receive atmospheric air 158, for example, when the user inhales (i.e., during an inspiration portion of a breathing cycle). The flow sensor 148 may be adapted to sense flow through the inspiration path 144, for example, during an inspiration. The outlet end 150 may be disposed opposite the vent port 146 with respect to the inspiration path 144. The two-position flow control valve 152 may be adapted to selectively switch between a first position connecting the outlet end 150 of the inspiration path 144 to the outlet port 142 and a second position connecting the output path 308 from the product tank 106 through the restriction orifice 154 to the output port 142. As shown, the two-position flow control valve 152 is in the first position.

The controller 301 may include various processes to control the two-position flow control valve 152 in response to the selected volume and the monitored pressure. In cooperation with the restriction orifice 154, the monitored pressure from the pressure sensor 112 may be related to flow through the output path 308 by the controller 301. Further, the controller 301 may relate flow through the output path 308 to volume, for example, with respect to an individual pulse duration and/or accumulated pulse durations. In this regard, the controller 301 may control the flow of the pulsed concentrated product gas 156 through the output path 308, at least in part, by controlling the two-position flow control valve 152. More specifically, the controller 301 may include a rising edge control process and a trailing edge control process for controlling the two-position flow control valve 152 to define each pulse duration during pulsed output mode. The rising edge control process may include switching the two-position flow control valve 152 to the second position in response to detecting flow through the inspiration path 144 above a predetermined threshold when the two-position flow control valve 152 is in the first position. The trailing edge control process may include switching the two-position flow control valve 152 from the second position to the first position in response to at least one of the selected volume and the monitored pressure.

Figure 20:
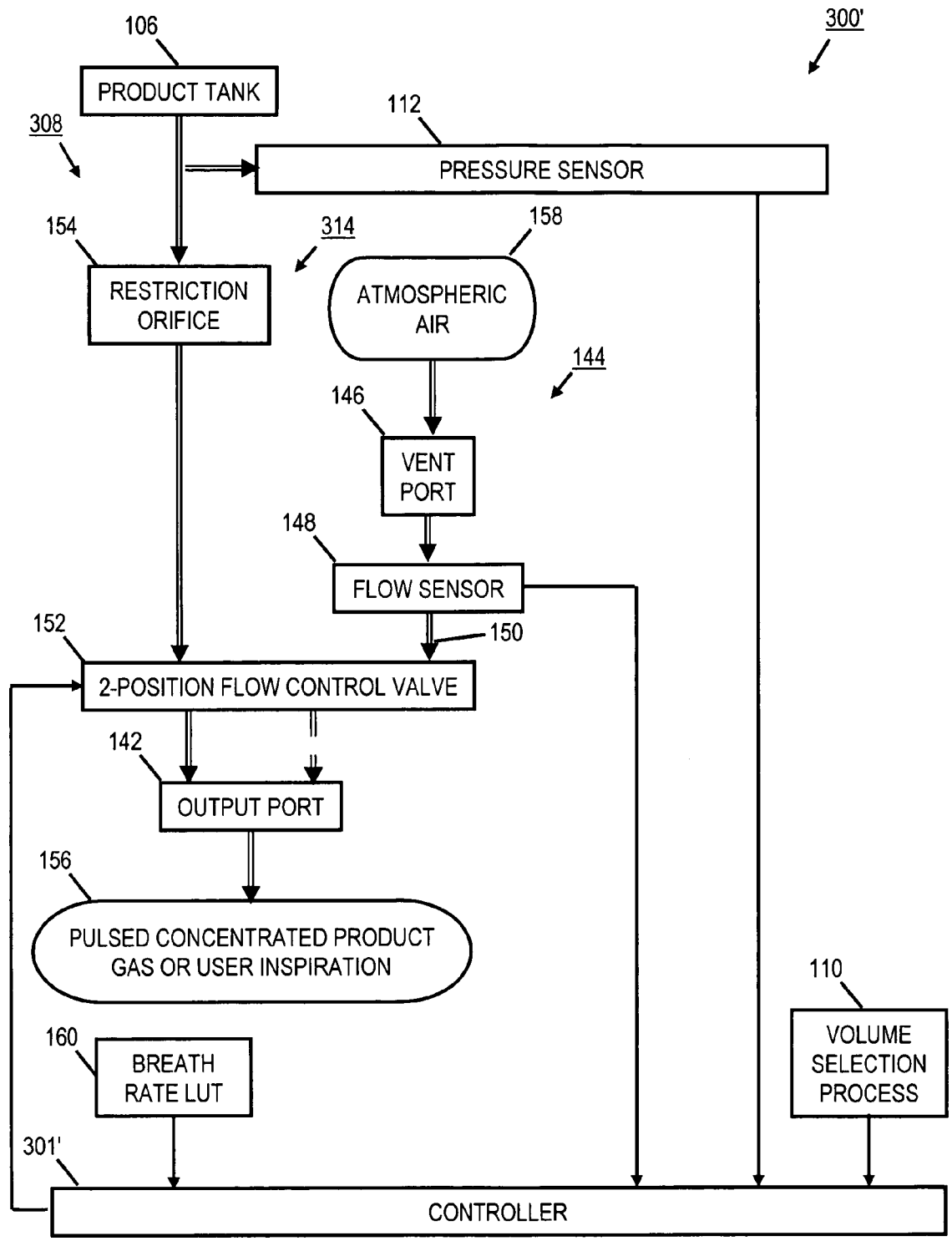
FIG. 20 is a block diagram which, in combination with an input portion of FIG. 11, provides another exemplary embodiment of a product gas concentrator operating in a pulsed output mode.

With reference to FIGS. 20 and 11, another exemplary embodiment of a product gas concentrator 300' operating in a pulsed output mode may include the pressurizing process 102, gaseous component separation process 104, product tank 106, volume selection process 110, output path 308, a breath rate LUT 160, and a controller 301'. The output path 308 may include the pressure sensor 112, output port 142, inspiration path 144, and flow control process 314. The inspiration path 144 may include the vent port 146, flow sensor 148, and outlet end 150. The flow control process 314 may include the two-position flow control valve 152 and restriction orifice 154. The pressurizing process 102, gaseous component separation process 104, product tank 106, volume selection process 110, and pressure sensor 112 may operate as describe above for FIG. 11. The output path 308, output port 142, inspiration path 144, flow control process 314, vent port 146, flow sensor 148, outlet end 150, two-position flow control valve 152, and restriction orifice 154 may operate as described above for FIG. 19. Generally, the product gas concentrator 300' may provide a pulsed concentrated product gas 156 (e.g., a breathing gas with a concentration of oxygen) via the output path 308.

The controller 301' may include the rising edge control process and trailing edge control process for controlling the two-position flow control valve 152 as described above for FIG. 19. Additionally, the controller 301' may include a breath rate process that includes determining a breath rate associated with the user based on a sequence of detections of flow through the inspiration path 144 above the predetermined threshold between switching cycles of the two-position flow control valve 152. The trailing edge control process may determine when to switch the two-position flow control valve 152 from the second position to the first position based on the determined breath rate in combination with at least one of the selected volume and the monitored pressure.

The breath rate LUT 160 may include lookup values for certain parameters related to certain corresponding measured and/or determined values of certain other parameters. For example, the breath rate LUT 160 may include lookup values for the breath rate in relation to corresponding values associated with a time between one or more consecutive sensed inspirations by the flow sensor 148. In other embodiments, the breath rate LUT 160 may include lookup values for the sensed flow in the inspiration path 144 related to corresponding values associated with a signal from the flow sensor 148, lookup values for an actual volume dispensed during a pulse duration related to one or more monitored pressures during the pulse duration and a known time for the pulse duration, and/or lookup values for monitored pressure related to corresponding values associated with the signal from the pressure sensor 112. The controller 301' may retrieve lookup values from the breath rate LUT 160 in conjunction with the various processes controlling the flow of the pulsed concentrated product gas 156 through the output path 308.

Figure 21:
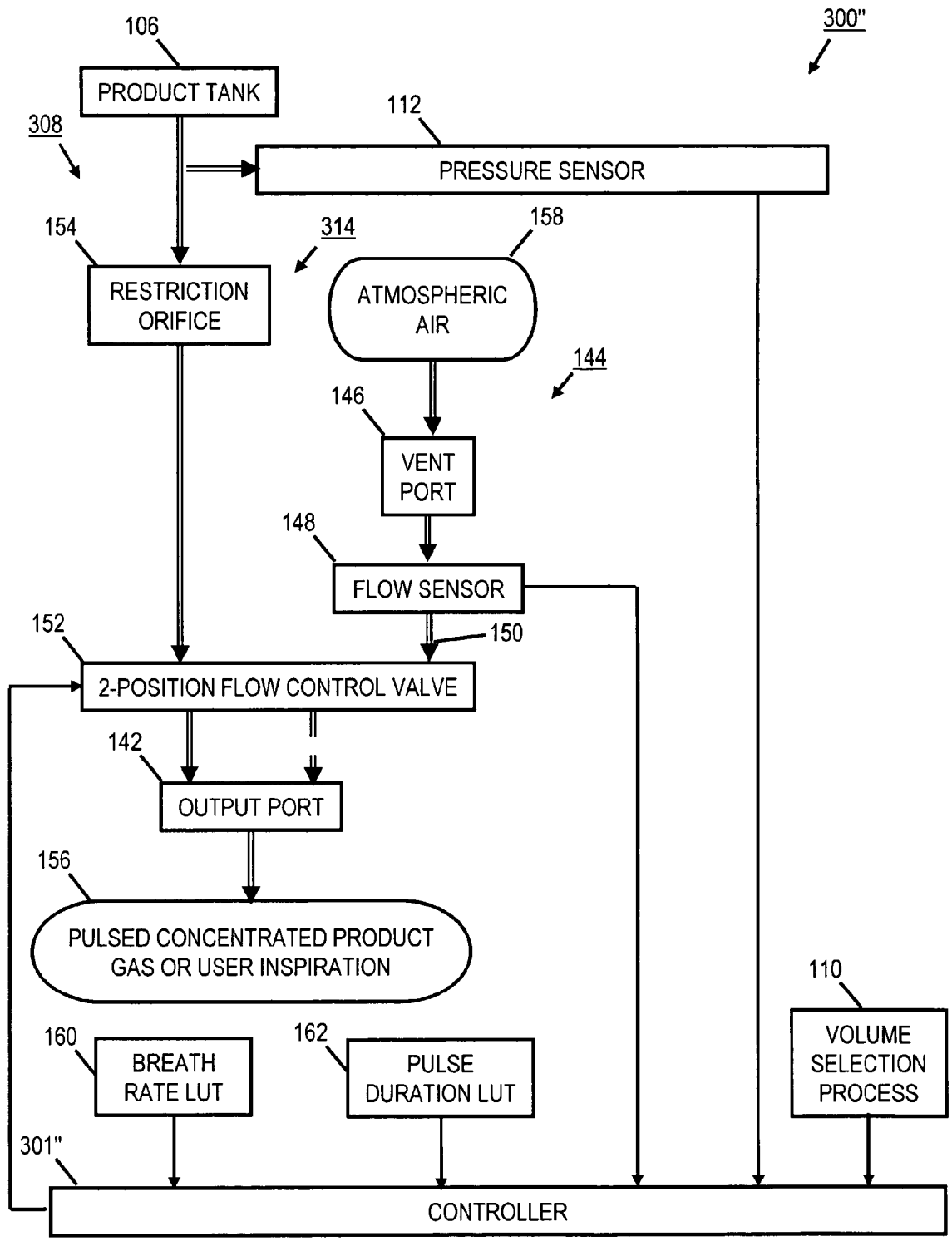
FIG. 21 is a block diagram which, in combination with an input portion of FIG. 11, provides yet another exemplary embodiment of a product gas concentrator operating in a pulsed output mode.

With reference to FIGS. 21 and 11, yet another exemplary embodiment of a product gas concentrator 300" operating in a pulsed output mode may include may include the pressurizing process 102, gaseous component separation process 104, product tank 106, volume selection process 110, breath rate LUT 160, output path 308, a pulse duration LUT 162, and a controller 301". The output path 308 may include the pressure sensor 112, output port 142, inspiration path 144, and flow control process 314. The inspiration path 144 may include the vent port 146, flow sensor 148, and outlet end 150. The flow control process 314 may include the two-position flow control valve 152 and restriction orifice 154. The pressurizing process 102, gaseous component separation process 104, product tank 106, volume selection process 110, and pressure sensor 112 may operate as describe above for FIG. 11. The output path 308, output port 142, inspiration path 144, flow control process 314, vent port 146, flow sensor 148, outlet end 150, two-position flow control valve 152, and restriction orifice 154 may operate as described above for FIG. 19. The breath rate LUT 160 may operate as described above for FIG. 20. Generally, the product gas concentrator 300" may provide a pulsed concentrated product gas 156 (e.g., a breathing gas with a concentration of oxygen) via the output path 308.

The controller 301" may include the rising edge control process and trailing edge control process for controlling the two-position flow control valve 152 as described above for FIGS. 19 and 20. Additionally, the controller 301" may include an aggregate dispensing time process and a pulse duration process. The aggregate dispensing time process may include determining a time required to dispense the selected volume of concentrated product gas in relation to the monitored pressure and the determined breath rate over a relatively broad period of time, such as a minute or more. The pulse duration process may include allocating the determined time to pulse durations associated with individual pulses of concentrated product gas over the determined time. In one embodiment, the functions of the aggregate dispensing time process and pulse duration process may be combined when the aggregate time is reduced to approach the time for an individual user breathing cycle. The trailing edge control process may determine when to switch the two-position flow control valve 152 from the second position to the first position based on the determined breath rate and pulse duration in combination with at least one of the selected volume and the monitored pressure.

The pulse duration LUT 162 may include lookup values for certain parameters related to certain corresponding measured and/or determined values of certain other parameters. For example, the pulse duration LUT 162 may include lookup values for the pulse duration in relation to corresponding values associated with a determined breath rate. The controller 301" may retrieve lookup values from the pulse duration LUT 162 in conjunction with the various processes controlling the flow of the pulsed concentrated product gas 156 through the output path 308.

Figure 22:
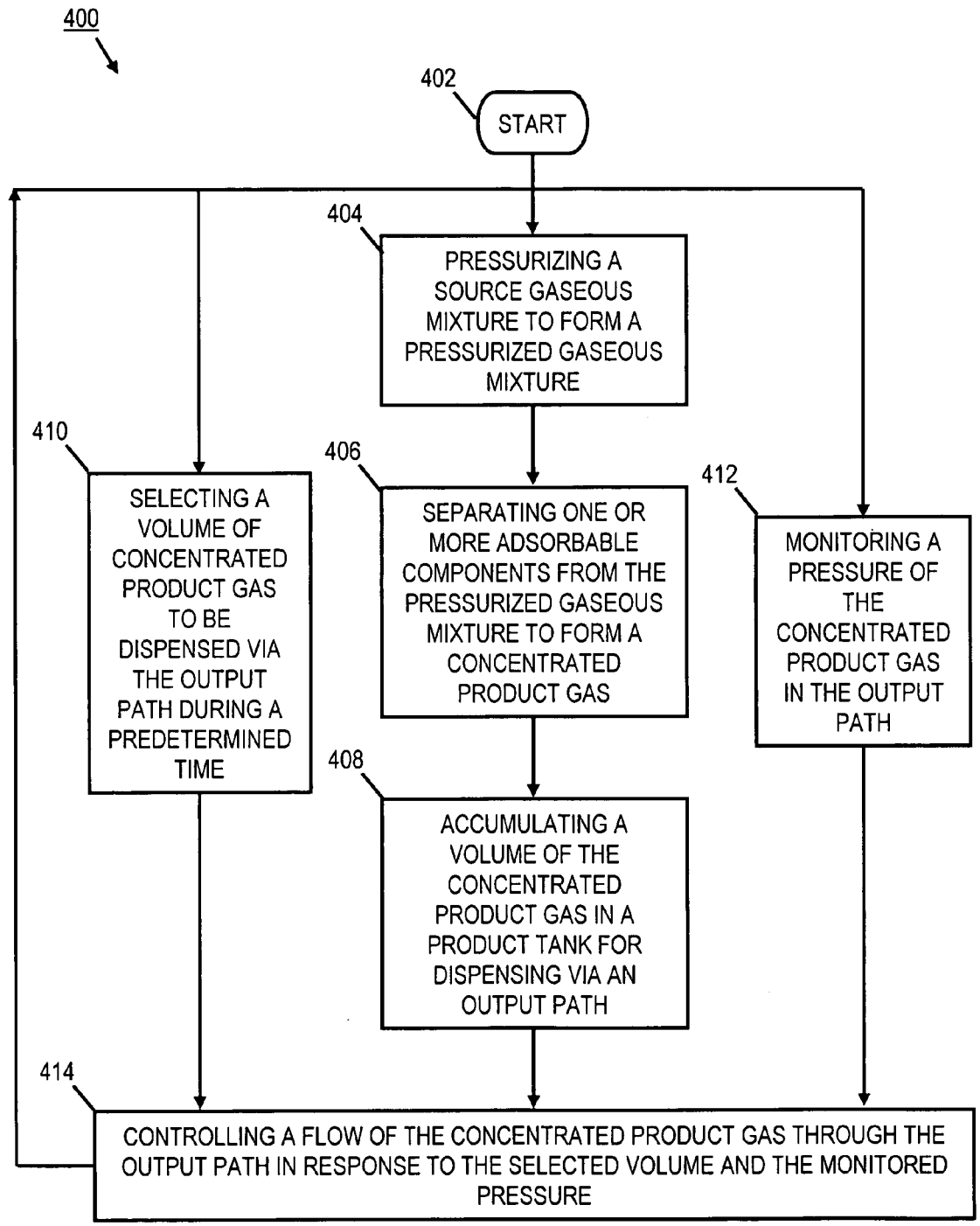
FIG. 22 is a flowchart of an exemplary embodiment of a process for providing a concentrated product gas.

With reference to FIG. 22, an exemplary embodiment of a process 400 for providing a concentrated product gas may begin at 402 when the process starts. At 404, a source gaseous mixture may be pressurized to form a pressurized gaseous mixture. Next, one or more adsorbable components may be separated from the pressurized gaseous mixture to form a concentrated product gas (406). At 408, a volume of the concentrated product gas is accumulated in a product tank for dispensing via an output path. Additionally, a volume of concentrated product gas to be dispensed via the output path during a predetermined time may be selected (410). Moreover, a pressure of the concentrated product gas in the output path may be monitored (412). At 414, flow of the concentrated product gas through the output path is controlled in response to the selected volume and the monitored pressure. At this point, the process may be repeated.

Figure 23:
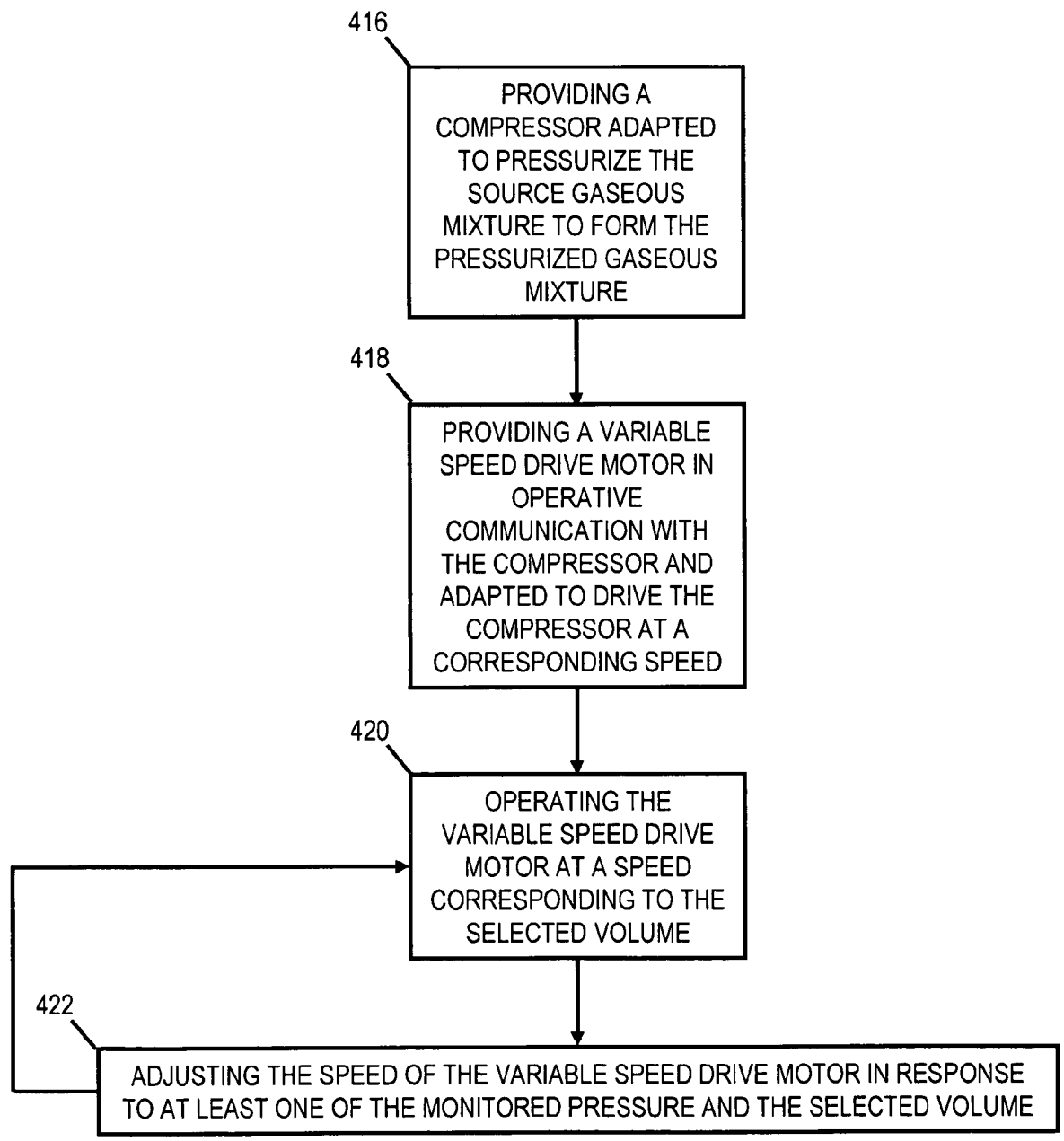
FIG. 23 is a flowchart which, in combination with FIG. 22, provides another exemplary embodiment of a process for providing a concentrated product gas.

With reference to FIG. 23, another embodiment of the exemplary process (e.g., FIG. 22, 400) for providing a concentrated product gas may include providing a compressor (416). The compressor may be adapted to pressurize the source gaseous mixture to form the pressurized gaseous mixture. At 418, a variable speed drive motor in operative communication with the compressor may be provided. The drive motor may be adapted to drive the compressor at a corresponding speed. Next, the variable speed drive motor may be operated at a speed corresponding to the selected volume (420). At 422, the speed of the variable speed drive motor may be adjusted in response to at least one of the monitored pressure and the selected volume. At this point, the process may be repeated.

Figure 24:
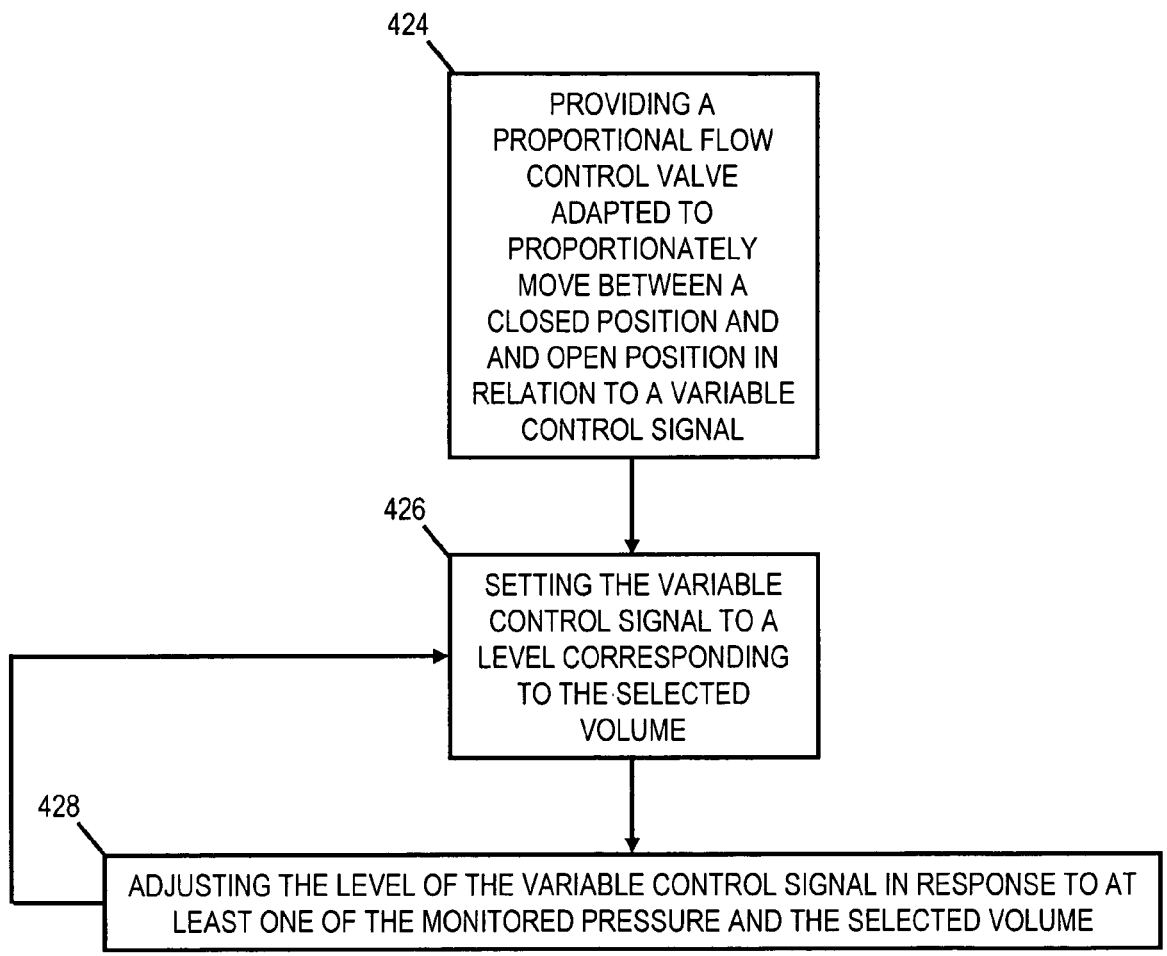
FIG. 24 is a flowchart which, in combination with FIG. 22, provides an exemplary embodiment of a process for providing a concentrated product gas operating in a continuous output mode.

With reference to FIG. 24, an embodiment of the exemplary process (e.g., FIG. 22, 400) for providing a concentrated product gas in a continuous output mode may include providing a proportional flow control valve (424). The proportional flow control valve may be adapted to proportionately move between a closed position and an open position in relation to a variable control signal. At 426, the variable control signal may be set to a level corresponding to the selected volume. Then, the level of the variable control signal may be adjusted in response to at least one of the monitored pressure and the selected volume (428). At this point, the process may be repeated.

Figure 25:
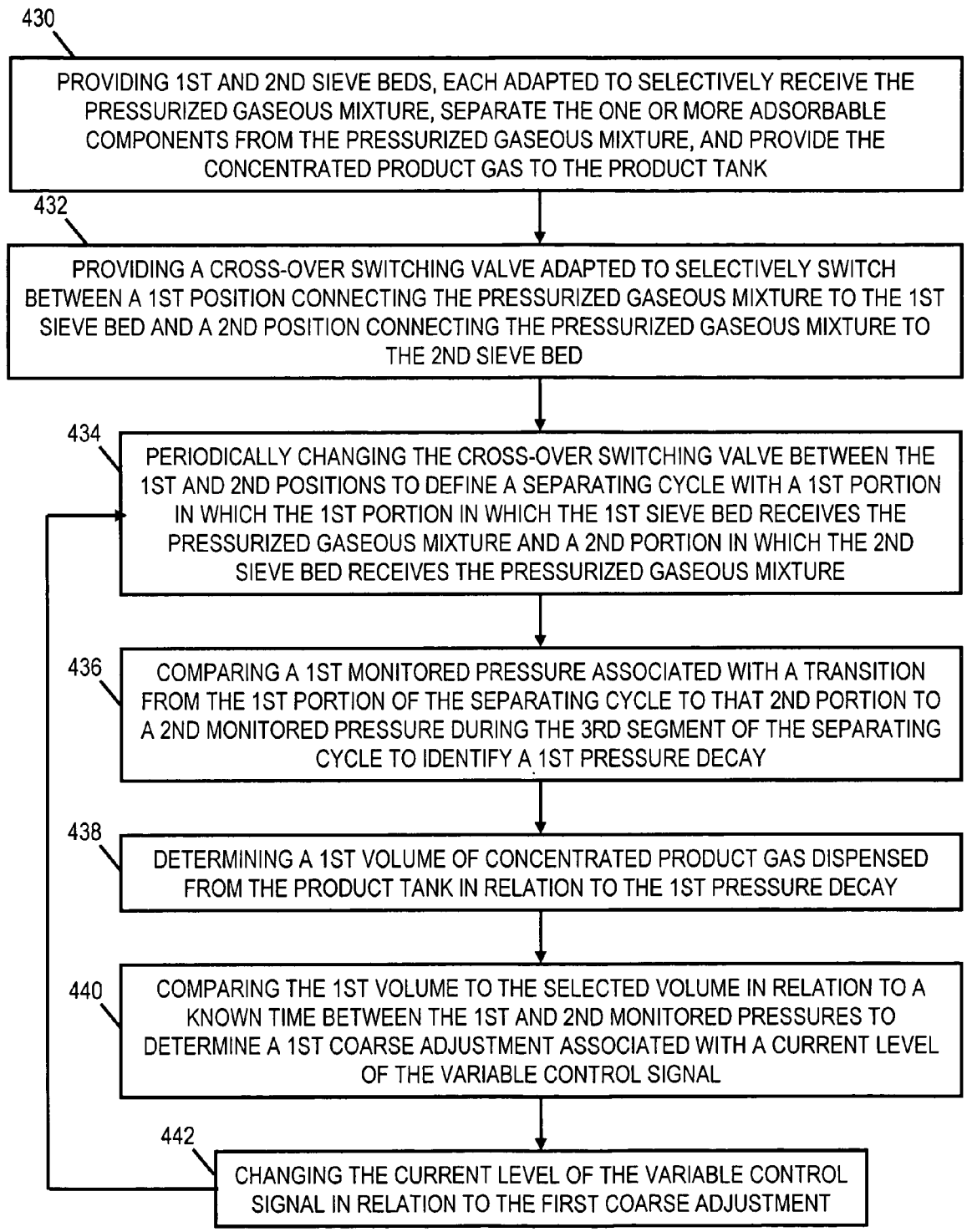
FIG. 25 is a flowchart which, in combination with FIG. 22, provides another exemplary embodiment of a process for providing a concentrated product gas operating in a continuous output mode.

With reference to FIG. 25, another embodiment of a exemplary process (e.g., FIG. 24) for providing a concentrated product gas in a continuous output mode may include providing first and second sieve beds (430). Each sieve bed may be adapted to selectively receive the pressurized gaseous mixture, separate the one or more adsorbable components from the pressurized gaseous mixture, and provide the concentrated product gas to the product tank. At 432, a cross-over switching valve may be provided. The cross-over switching valve may be adapted to selectively switch between a first position connecting the pressurized gaseous mixture to the first sieve bed and a second position connecting the pressurized gaseous mixture to the second sieve bed. Next, the cross-over switching valve may be periodically changed between the first and second positions to define a separating cycle (434). The separating cycle may include a first portion in which the first sieve bed receives the pressurized gaseous mixture and a second portion in which the second sieve bed receives the pressurized gaseous mixture. The first portion may include a first segment in which the first sieve bed separates the one or more adsorbable components from the pressurized gaseous mixture and a second segment in which the first sieve bed continues separating the one or more adsorbable components from the pressurized gaseous mixture and also provides the concentrated product gas to the product tank. The second portion may include a third segment in which the second sieve bed separates the one or more adsorbable components from the pressurized gaseous mixture and a fourth segment in which the second sieve bed continues separating the one or more adsorbable components from the pressurized gaseous mixture and also provides the concentrated product gas to the product tank.

At 436, a first monitored pressure associated with a transition from the first portion of the separating cycle to the second portion may be compared to a second monitored pressure during the third segment of the separating cycle to identify a first pressure decay. Next, a first volume of concentrated product gas dispensed from the product tank in relation to the first pressure decay may be determined (438). At 440, the first volume may be compared to the selected volume in relation to a known time between the first and second monitored pressures to determine a first coarse adjustment associated with a current level of the variable control signal. Then, the current level of the variable control signal may be changed in relation to the first coarse adjustment (442). At this point, the process may be repeated.

Figure 26:
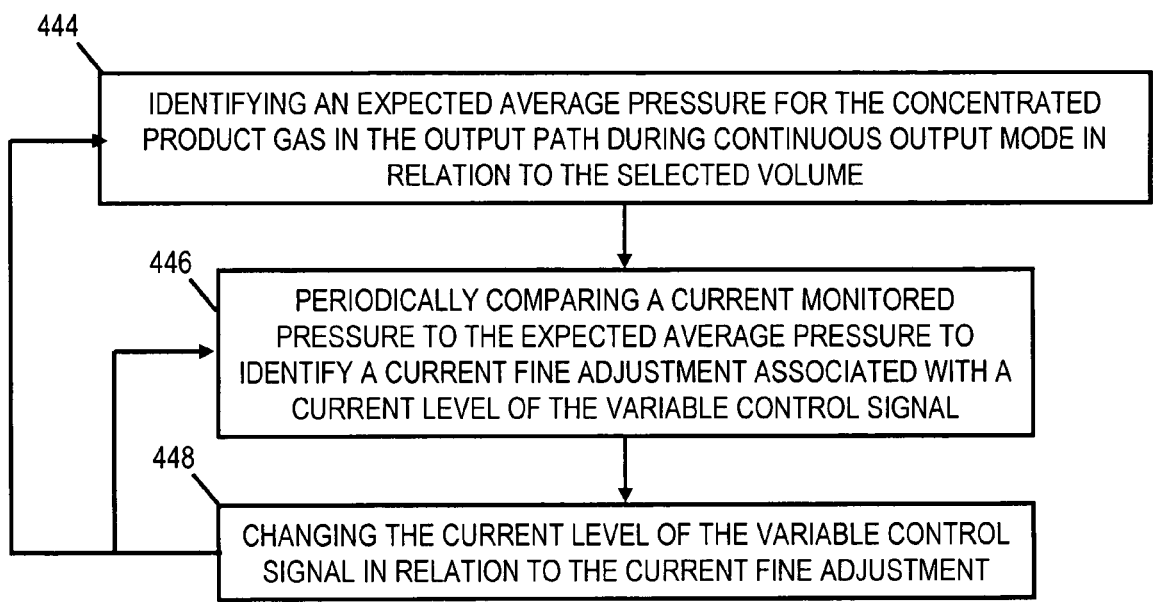
FIG. 26 is a flowchart which, in combination with FIG. 22, provides yet another exemplary embodiment of a process for providing a concentrated product gas operating in a continuous output mode.

With reference to FIG. 26, yet another embodiment of the exemplary process (e.g., FIG. 24) for providing a concentrated product gas in a continuous output mode may include identifying an expected average pressure for the concentrated product gas in the output path during continuous output mode in relation to the selected volume (444). At 446, a current monitored pressure may be periodically compared to the expected average pressure to identify a current fine adjustment associated with a current level of the variable control signal. In another embodiment, the current fine adjustment may be identified as a predetermined percentage or factor of the current monitored pressure. Next, the current level of the variable control signal may be changed in relation to the current fine adjustment (448). At this point, the process may be repeated.

Figure 27:
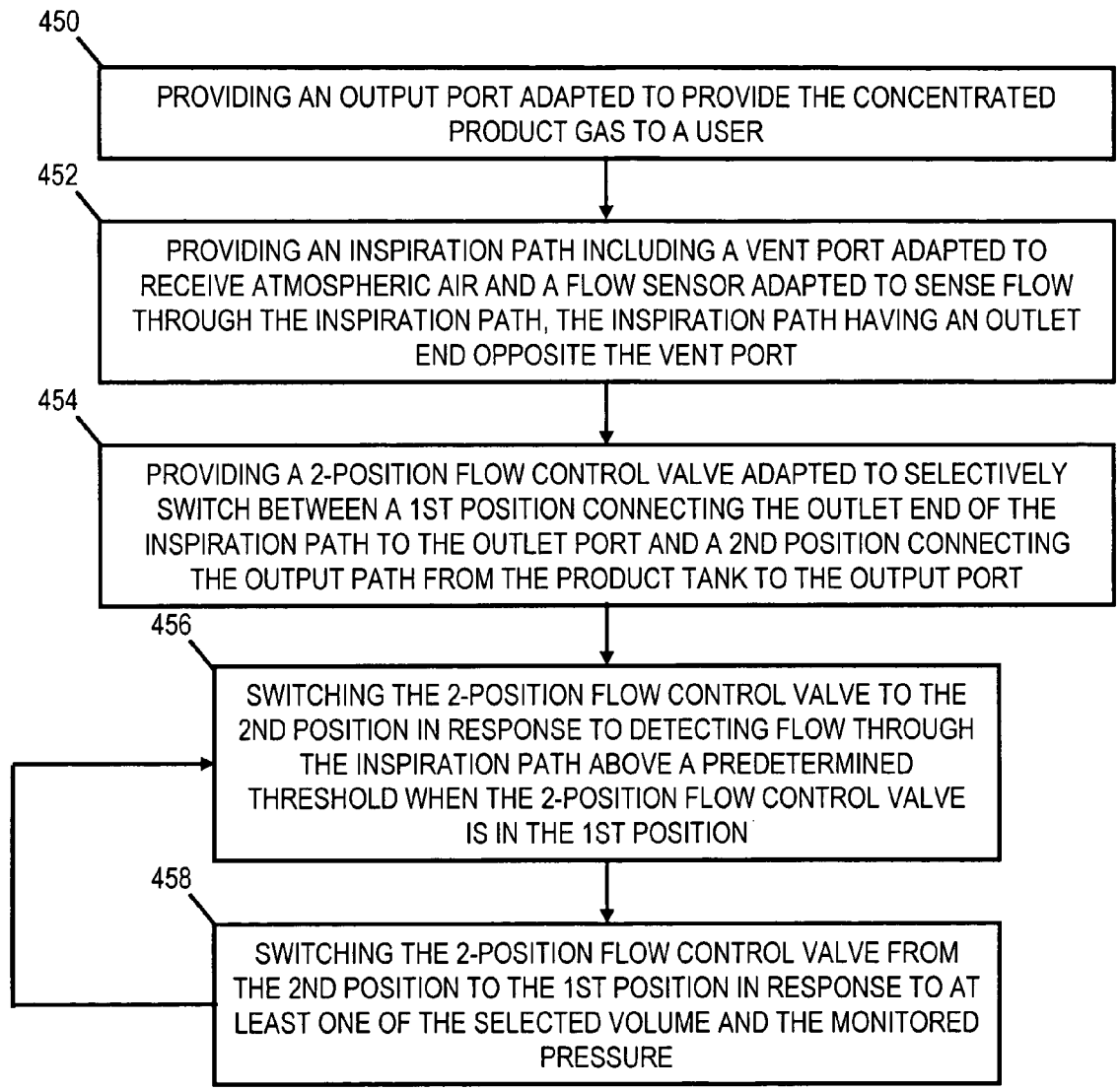
FIG. 27 is a flowchart which, in combination with FIG. 22, provides an exemplary embodiment of a process for providing a concentrated product gas operating in a pulsed output mode.

With reference to FIG. 27, an embodiment of the exemplary process (e.g., FIG. 22, 400) for providing a concentrated product gas in a pulsed output mode may include providing an output port (450). The output port may be adapted to provide the concentrated product gas to a user. At 452, an inspiration path may be provided. The inspiration path may include a vent port adapted to receive atmospheric air and a flow sensor adapted to sense flow through the inspiration path. The inspiration path may include an outlet end opposite the vent port. Next, a two-position flow control valve may be provided (454). The two-position flow control valve may be adapted to selectively switch between a first position connecting the outlet end of the inspiration path to the outlet port and a second position connecting the output path from the product tank to the output port. At 456, the two-position flow control valve may be switched to the second position in response to detecting flow through the inspiration path above a predetermined threshold when the two-position flow control valve is in the first position. Then, the two-position flow control valve may be switched from the second position to the first position in response to at least one of the selected volume and the monitored pressure (458). At this point, the process may be repeated.

Figure 28:
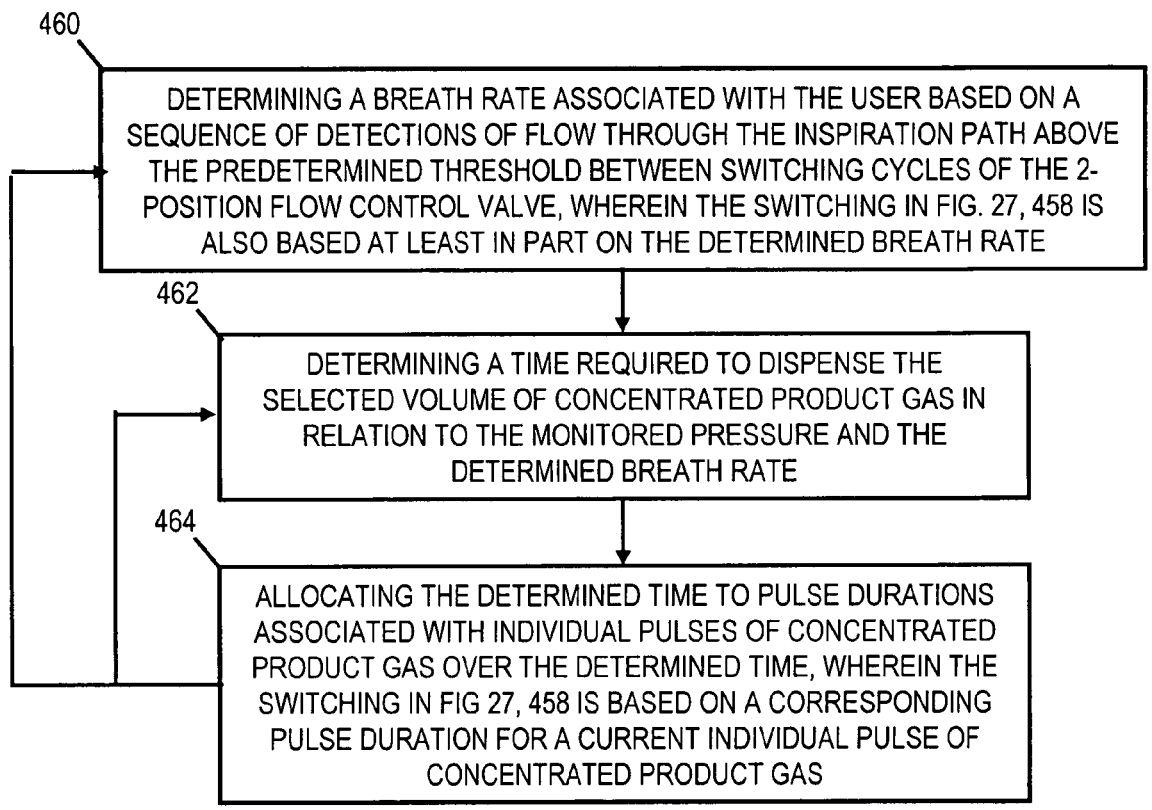
FIG. 28 is a flowchart which, in combination with FIG. 22, provides several additional exemplary embodiments of a process for providing a concentrated product gas operating in a pulsed output mode.

With reference to FIG. 28, another embodiment of the exemplary process (e.g., FIG. 27) for providing a concentrated product gas in a pulsed output mode may include determining a breath rate associated with the user. The breath rate may be based on a sequence of detections of flow through the inspiration path above the predetermined threshold between switching cycles of the two-position flow control valve. In this embodiment, the switching in FIG. 27, 458 may also be based, at least in part, on the determined breath rate. At this point, this embodiment of the process may be repeated.

In still another embodiment, the exemplary process (e.g., FIG. 27) may also include determining a time required to dispense the selected volume of concentrated product gas in relation to the monitored pressure and the determined breath rate (462). At 464, the determined time may be allocated to pulse durations associated with individual pulses of concentrated product gas over the determined time, wherein the switching in FIG. 27, 458 may also be based on a corresponding pulse duration for a current individual pulse of concentrated product gas. At this point, this additional embodiment of the process may be repeated.

Figure 29:
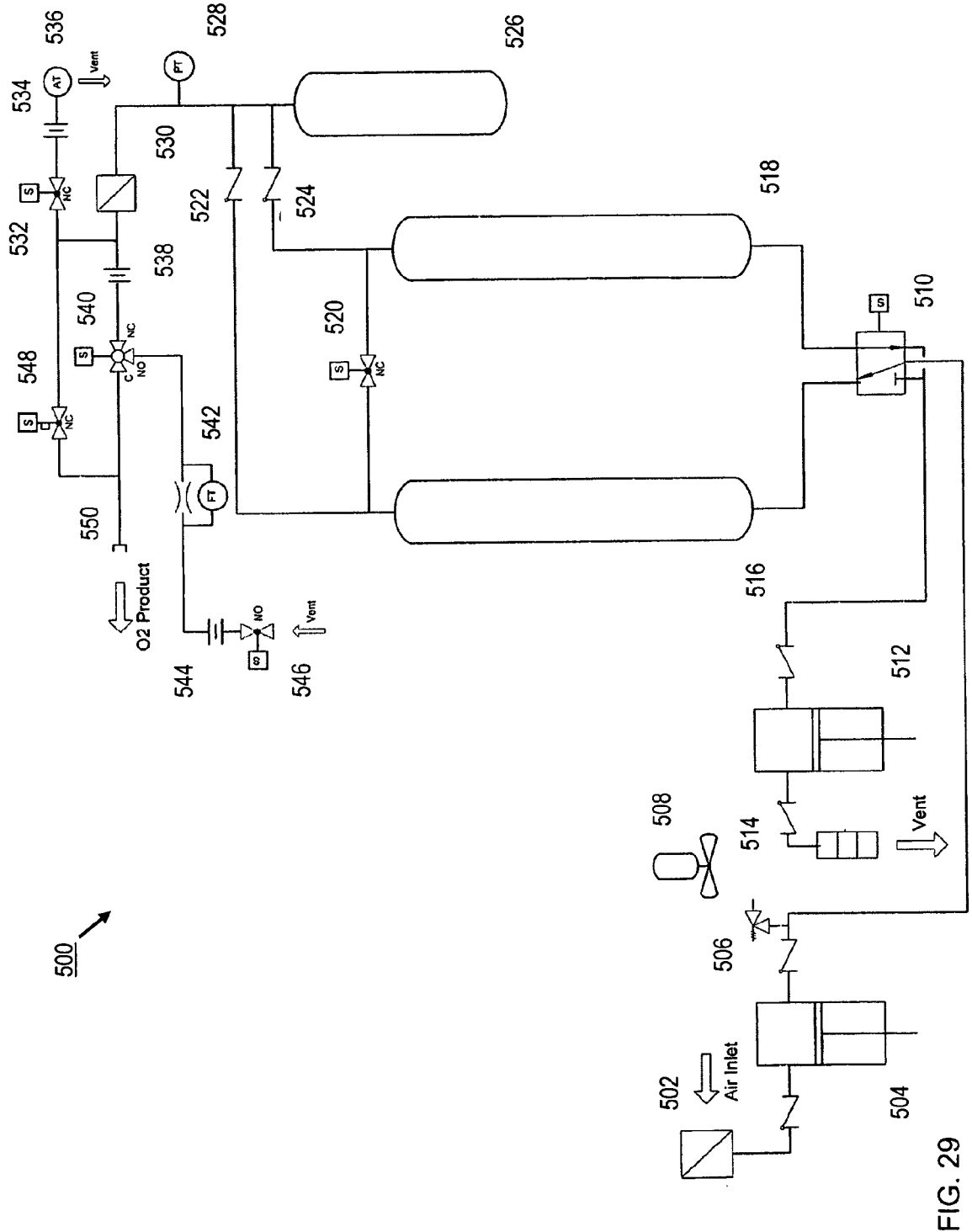
FIG. 29 is a flow diagram of an exemplary embodiment of a product gas concentrator.

With reference to FIG. 29, an exemplary embodiment of a product gas concentrator 500 is presented in a flow diagram. In this embodiment, the product gas concentrator 500 may include an air inlet filter/silencer 502, a compressor 504, a pressure relief valve 506, a fan 508, a cross-over switching valve 510, a vacuum pump 512, a vacuum vent/muffler 514, a first sieve bed 516, a second sieve bed 518, a PE valve 520, a first check valve 522, a second check valve 524, a product tank 526, a pressure sensor 528, a HEPA filter 530, an oxygen sensor isolation valve 532, a first restriction orifice 534, an oxygen sensor/vent 536, a second restriction orifice 538, a two-position flow control valve 540, a flow sensor 542, a third restriction orifice 544, an inspiration valve/vent 546, a proportional flow control valve 548, and a user outlet fitting 550.

The air inlet filter/silencer 502, compressor 504, pressure relief valve 506, and cross-over switching valve 510 provides a path for a pressurized gaseous mixture to the first and second sieve beds 516, 518. The cross-over switching valve 510 vacuum pump 512, and vacuum vent/muffler 514 provides an de-pressurization path from the first and second sieve beds 516, 518 to ambient air. The PE valve 520 provides a pressure equalizing path between the first and second sieve beds 516, 518. The first check valve 522 provides a concentrated product gas path from the first sieve bed 516 to the product tank 526. The second check valve 524 provides a concentrated product gas path from the second sieve bed 518 to the product tank 526. The product tank 526, pressure sensor 528, HEPA filter 530, oxygen sensor isolation valve 532, first restriction orifice 534, and oxygen sensor/vent 536 provide a concentrated product gas path to ambient air for oxygen sensing purposes. The product tank 526, pressure sensor 528, HEPA filter 530, second restriction orifice 538, and two-position flow control valve 540 provide a concentrated product gas path to the user outlet fitting 550 during each pulse associated with pulsed output mode. The two-position flow control valve 540, flow sensor 542, third restriction orifice 544, and inspiration valve/vent 546 provide an inspiration path from the user outlet fitting 550 to ambient air during each conservation period associated with pulsed output mode. The product tank 526, pressure sensor 528, HEPA filter 530, and proportional flow control valve 548 provide a concentrated product gas path to the user outlet fitting 550 during continuous output mode.

Figure 30:
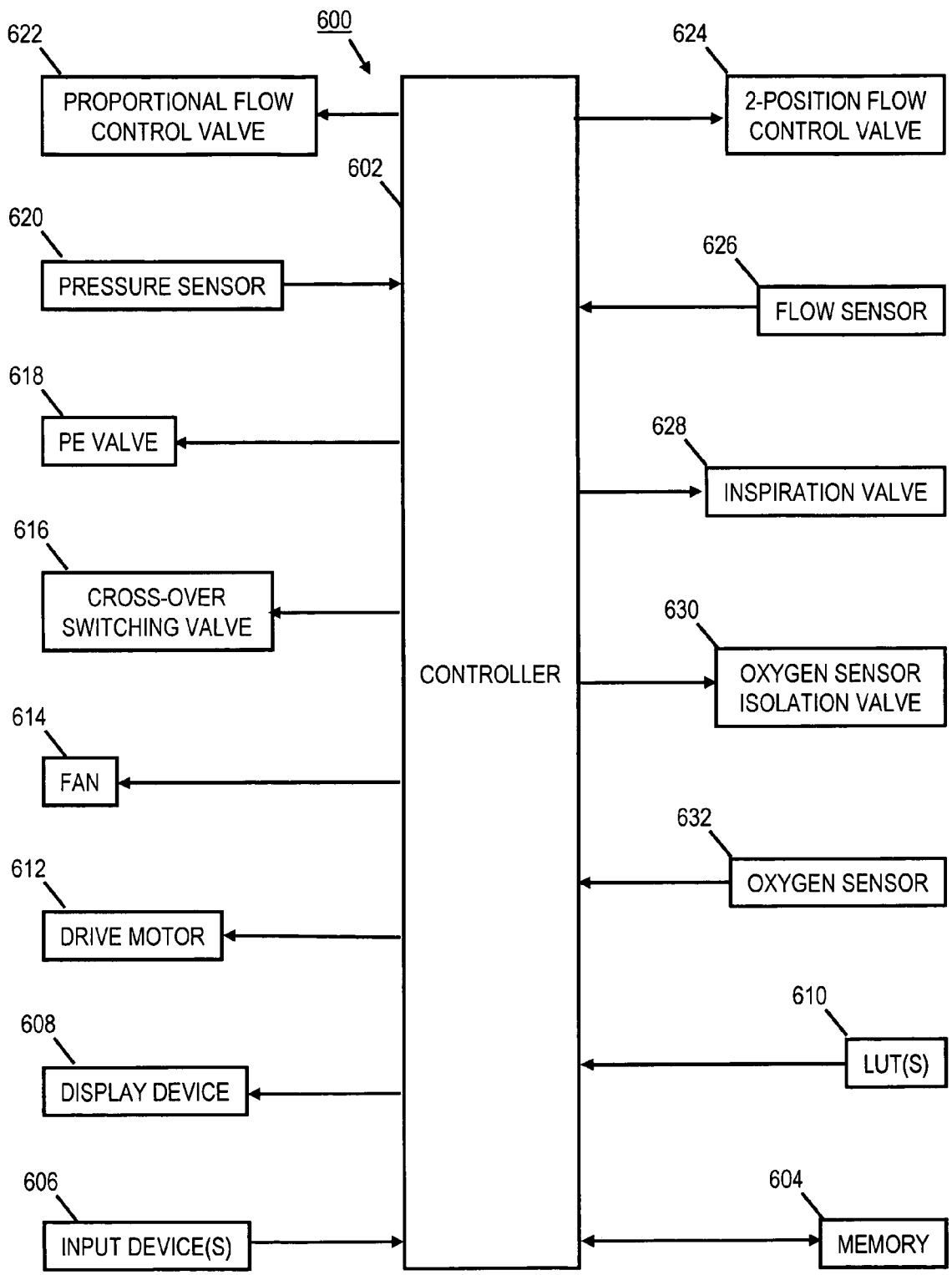
FIG. 30 is an electrical block diagram of an exemplary embodiment of a product gas concentrator.

With reference to FIG. 30 an exemplary embodiment of a product gas concentrator 600 is presented in an electrical block diagram. In this embodiment, the product gas concentrator 600 may include a controller 602, a memory 604, one or more input devices 606, a display device 608, one or more LUTs 610, a drive motor 612, a fan 614, a cross-over switching valve 616, a PE valve 618, a pressure sensor 620, a proportional flow control valve 622, a two-position flow control valve 624, a flow sensor 626, an inspiration valve 628, an oxygen sensor isolation valve 630, and an oxygen sensor 632.

The controller 602 may be microcontroller-based and may control operations in conjunction with software instructions and data stored in the memory 604. The controller 602 may receive input signals from the one or more input devices 606, pressure sensor 620, flow sensor 626, and oxygen sensor 632. The one or more input devices 606 and the display device 608 may provide a user interface to the controller 602. The controller 602 may interactively control the display device 608 in response to activations of the one or more input devices 606. For example, the controller 602 may present multiple choices in a menu, list, or graphic form on the display device 608 for navigation and selection via the one or more input devices 606. A user may use the one or more input devices 606 to interact with the display to, for example, select the continuous output mode or pulsed output mode. The controller 602 may retrieve data from the one or more LUTs 610 during operations, for example, to convert measured or determined parameters to corresponding related parameters.

The controller 602 may control the drive motor 612, fan 614, cross-over switching valve 616, PE valve 618, proportional flow control valve 622, two-position flow control valve 624, inspiration valve 628, and oxygen sensor isolation valve 630 in response to various user selections and various sensed conditions during operation of the product gas concentrator 600. The drive motor 612 may drive the compressor (FIG. 29, 504) and the vacuum pump (FIG. 29, 512). The fan 614 may provide cooling, for example, to the drive motor 612, compressor, and/or vacuum pump. The drive motor 612, cross-over switching valve 616, and PE valve 618 are associated with operation of the first and second sieve beds (FIG. 29, 516, 518) to form concentrated product gas from a source gaseous mixture. The proportional flow control valve 622 is interactively controlled during continuous output mode and closed during pulsed output mode. The two-position flow control valve 624 and inspiration valve 628 are interactively controlled during pulsed output mode. The two-position flow control valve 624 is inactive and the inspiration valve 628 is closed during continuous output mode. The oxygen sensor isolation valve 630 is normally closed and operated when an oxygen level in the concentrated product gas is to be detected by the oxygen sensor 632.

With general reference to FIGS. 29 and 30, another embodiment of a product gas concentrator includes at least sieve two beds, (e.g., FIG. 29, 516, 518) which are filled with a physical separation medium or material. The separation material selectively adsorbs one or more adsorbable components and passes one or more nonadsorbable components of such a gaseous mixture. The physical separation material is a molecular sieve with pores of uniform size and essentially the same molecular dimensions. These pores selectively adsorb molecules in accordance with molecular shape, polarity, degree of saturation, and the like. In the preferred embodiment, the physical separation medium is an aluminasilicate composition with 4 to 5 angstrom pores. More specifically, the molecular sieve is a sodium, calcium, or Lithium form of aluminasilicate, such as type 5A zeolite. Examples of a Lithium sieve include UOP Oxysiv 7 and UOP Oxysiv MDX. Alternately, the aluminasilicate may have a higher silicon to aluminum ratio, larger pores, and an affinity for polar molecules, e.g. type 13x zeolite. The zeolites adsorb nitrogen, carbon monoxide, carbon dioxide, water vapor, and other significant components of air.

A cross-over valving means (e.g., FIG. 29, 510) selectively connects each one of the beds with a source of the gas mixture, e.g. air under pressure, and the other bed with a negative pressure or vacuum. Specific to one embodiment, the cross-over valving means selectively connects one of the beds with an air pump or compressor (e.g., FIG. 29, 504) which supplies air under pressure and the other bed with a vacuum pump (e.g., FIG. 29, 512) which draws a vacuum. The compressor and vacuum pump are connected to a common drive motor (e.g., FIG. 30, 612). A solenoid or other cross-over valve actuating means selectively causes the cross-over valving means to move alternately between first and second positions. In the first position, the first bed is connected with the compressor and the second bed is connected with the vacuum pump. In the second position, the first bed is connected with the vacuum pump and the second bed is connected with the air compressor.

As the gas mixture is introduced under pressure through a bed inlet to an adsorbed gas-free or regenerated bed, an adsorption zone of finite, relatively large size is formed. This adsorption zone is a region of the bed in which the full capacity of the adsorbent to hold the adsorbable components has not been reached. The composition of the gas in the voids of the zeolite varies from substantially pure primary product gas at the outlet end to the ambient gaseous mixture composition at the inlet end. This adsorption zone moves from the bed inlet toward a bed outlet with a velocity significantly less than the superficial gas velocity in the bed and is dependent on the input gas pressure. When the adsorption zone reaches the outlet end of the bed, adsorbable components begin to flow through the bed outlet into the nonadsorbable primary product stream. This time is hereinafter referred to as the "breakthrough time". When breakthrough occurs, primary product enriched bed gas in the zeolite voids varies from a higher primary product gas concentration at the bed outlet to a lower concentration at the bed inlet. In the preferred embodiment the primary product enriched bed gas is about 80 percent primary product at breakthrough. While adsorption is occurring in one bed, the adsorbable components adsorbed by the separation medium of the other bed are removed under vacuum.

The first bed is connected with a product tank (e.g., FIG. 29, 526) by way of a first check valve (e.g., FIG. 29, 522) or other unidirectional valving means. The first check valve permits the primary product gas from the first bed to flow into the product tank when product gas pressure in the first bed exceeds the pressure of product gas in the product tank. The first check valve prohibits the product gas from flowing from the product tank when the pressure in the first bed is lower than the product tank. The second bed is connected with the product tank (e.g., FIG. 29, 526) by way of a second check valve (e.g., FIG. 29, 524) or other unidirectional valving means. The second check valve again provides for unidirectional flow of the primary product gas from the second bed to the product tank.

A pressure equalization flow path extends between a second pair of outlets of the first and second beds. The flow path has a sufficient gas flow capacity such that when one bed is under full pressure and the other bed is under full vacuum, gas flow through the pressure equalization path substantially equalizes the bed pressures. In one embodiment, the flow path capacity is sufficient to bring the beds into pressure equilibrium in about 10 percent of the cycle duration or about 2 seconds. A pressure equalization valve (e.g., FIG. 29, 520) selectively permits and prevents a gas flow through the flow path between the first and second beds. A timing and control means (e.g., FIG. 30, 602), which can be microprocessor-based, cyclically causes the cross-over valve actuating means (e.g., FIG. 30, 616) and the pressure equalization valve (e.g., FIG. 30, 618) to be operated. The timing and control means includes a clocking means that periodically and cyclically enables a cross-over valve control and a pressure equalization valve control.

Figure 31:
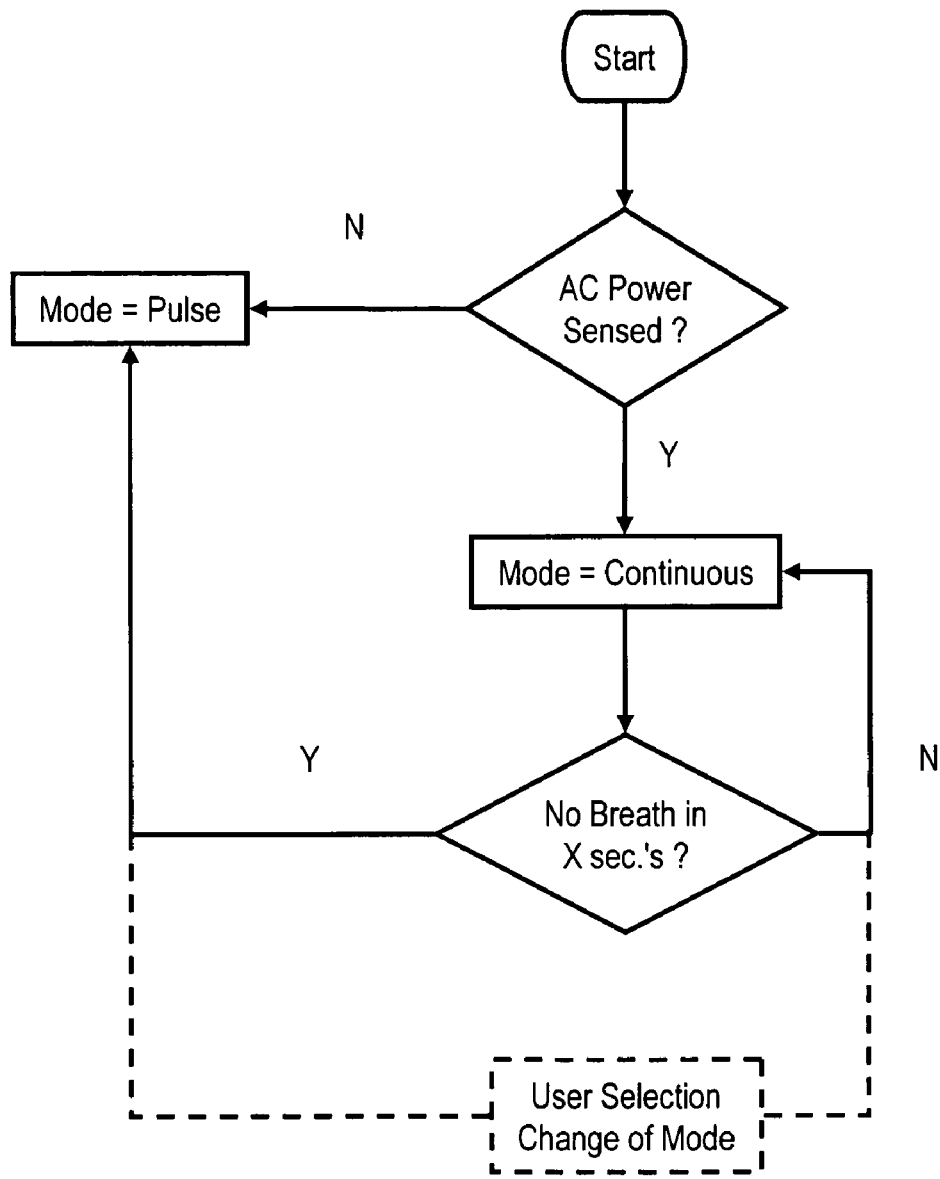
FIG. 31 is a flowchart of an exemplary embodiment of a mode selection process for a product gas concentrator adapted to operate in either a continuous output mode or a pulsed output mode.

With reference to FIG. 31, an exemplary embodiment of a mode selection process for a product gas concentrator adapted to operate in either a continuous output mode or a pulsed output mode is presented. This embodiment provides for continuous or pulse oxygen output modes. The mode can be set by user preference though an input panel or by automatic selection based on power source. For example, upon the detection of AC power, continuous oxygen output can be automatically selected as the default control mode. Upon detection of the lack of AC power (i.e., DC or battery power is being used), pulsed oxygen output can be automatically selected as the default control mode. The user can selectively modify such default modes after power-up. Pulsed output mode can also be automatically switched off if no breaths are detected over a time interval to thereby conserve power and reduce wear on the system. In another embodiment, pulsed output mode can be automatically switched to continuous mode if no breaths are detected over a predetermined time interval to aid the user if a breathing problem has occurred.

A demand-based embodiment of control is provided. The demand control can be based on, but not limited to, user selection of flow rate (i.e., liters per minute) during continuous mode (see FIG. 32), sensed breath and user selection of pulse size (i.e., duration of pulse) during pulse mode (see FIG. 33), and sensed oxygen concentration output based on atmospheric variations, equipment wear, etc. for any mode. In the flowcharts, the rectangular elements denote "processing blocks" and represent computer software instructions or groups of instructions. The diamond shaped elements denote "decision blocks" and represent computer software instructions or groups of instructions which affect the execution of the computer software instructions represented by the processing blocks. Alternatively, the processing and decision blocks represent steps performed by functionally equivalent circuits such as a digital signal processor circuit or an application-specific integrated circuit (ASIC). The flow diagram does not depict syntax of any particular programming language. Rather, the flow diagram illustrates the functional information one skilled in the art may use to fabricate circuits or to generate computer software to perform the processing of the system. It should be noted that many routine program elements, such as initialization of loops and variables and the use of temporary variables are not shown In one embodiment, the demand control varies or adjusts the speed of the motor (e.g., FIG. 30, 612) running the compressor (e.g., FIG. 29, 504) and vacuum (e.g., FIG. 29, 512) to the sieve beds(e.g., FIG. 29, 516, 518). In connection therewith, the timing of the main switching valve (e.g., FIG. 29, 510), pressure equalization valve (e.g., FIG. 29, 520) and product flow control valve (e.g., FIG. 29, 540) is also controlled. In other embodiments, the speed of the compressor and vacuum motor is constant while the product control valve (e.g., FIG. 29, 548) timing is adjusted (see FIG. 33).

Figure 32:
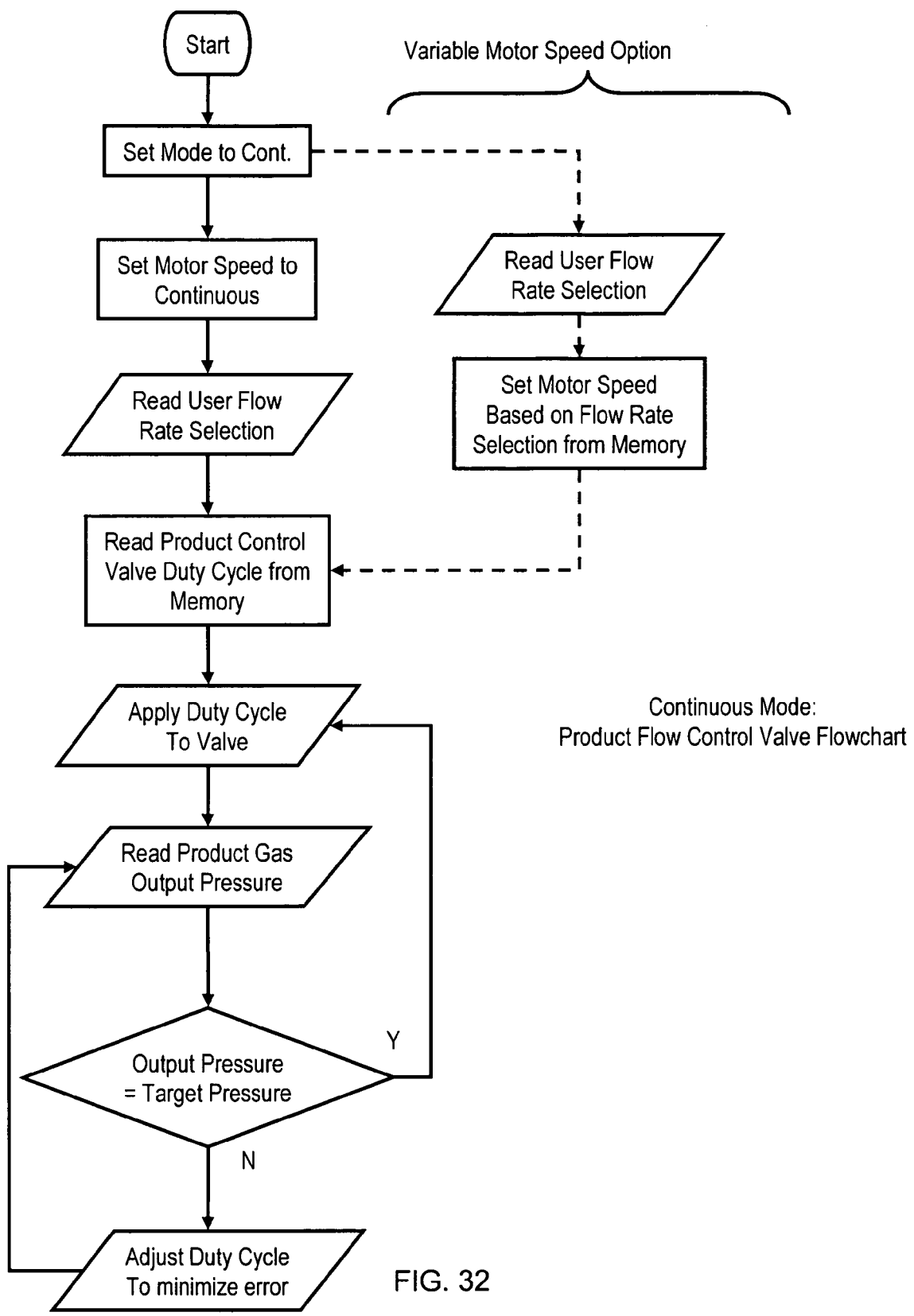
FIG. 32 is a flowchart of another exemplary embodiment of a process for providing a concentrated product gas operating in a continuous output mode.

With reference to FIG. 32, another exemplary embodiment of a process for providing a concentrated product gas in a continuous output mode is presented. For example, in the continuous mode, demand control is based on user selection of flow rate. In one embodiment, the compressor and vacuum motor speed can be maintained constant while the duty cycle of product flow control valve (e.g., FIG. 29, 548) is provided from a flow rate or product pressure to duty cycle look-up table (e.g., FIG. 30, 610) in a memory (e.g., FIG. 30, 604) associated with controller (e.g., FIG. 30, 602). The duty cycle can then be adjusted or tuned as needed based on a feedback reading of pressure transducer (e.g., FIG. 30, 620) by controller. Hence, flow regulation is achieved via controller modifying the duty cycle of the product flow control valve (e.g., FIG. 29, 548).

Figure 33:
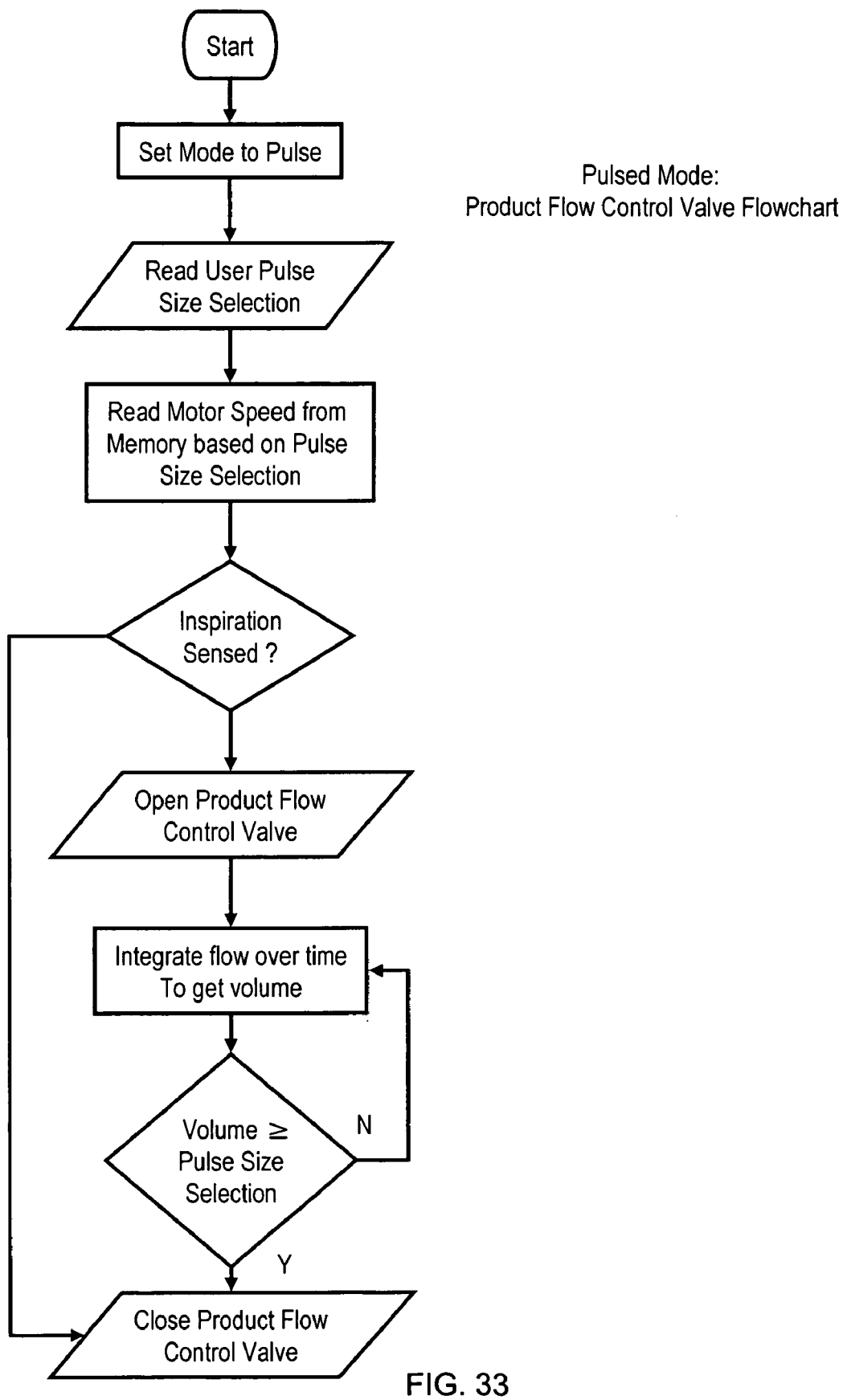
FIG. 33 is a flowchart of another exemplary embodiment of a process for providing a concentrated product gas operating in a pulsed output mode.

With reference to FIG. 33, another exemplary embodiment of a process for providing a concentrated product gas in a pulsed output mode is presented. In pulse mode, a breath trigger is used to open the product flow control valve (e.g., FIG. 29, 540). A breath is sensed by flow sensor (e.g., FIG. 29, 542). In particular, an inspiratory breath causes a drop in pressure in the product gas output line. This drop in pressure causes a small amount of ambient air to flow into flow sensor via valve (e.g., FIG. 29, 546). Detection of this flow indicates to the controller (e.g., FIG. 30, 602) that an inspiration is present.

Upon detection of an inspiration, controller opens product flow control valve (e.g., FIG. 29, 540) for a duration of time. This duration of time is based on the user pulse size selection and the volume of flow through the product flow control valve. The volume of flow is determined by, for example, integrating the flow over time through the product flow control valve. The flow can be approximated such as via the following equation:

$$Q = K\sqrt{(P_1 - P_0)}$$

where Q is flow rate, K is a flow constant associated with the product flow control valve, and $P_1$ (e.g., product tank pressure) and $P_0$ (e.g., atmospheric pressure) are pressures on each side of the product flow control valve as measured by pressure transducer (e.g., FIG. 29, 528). Other equations approximating flow from pressure can also be used. Alternatively, a flow sensor can be placed in the product gas output line proximate the product flow control valve.

In operation, the product control valve (e.g., FIG. 29, 540) stays open until the volume (or integration of flow over time) is greater than or equal to the pulse size selection. When the volume is greater than or equal to the pulse size selection, the product flow control valve closes and waits for the next detection of inhalation. This sequence also allows controller (e.g., FIG. 30, 602) to determine the breath rate of the patient by measuring the time between the onset of inspirations.

Generally, in demand modes where the compressor and vacuum motor speed is modified, the timing of main switching valve 6 and pressure equalization valve (e.g., FIG. 29, 520) is also adjusted based so as achieve the proper pressure swing adsorption results through sieve beds (e.g., FIG. 29, 516, 518). For example, for any given motor speed, the pressure and vacuum developed for sieve beds can be determined empirically and stored in the memory (e.g., FIG. 30, 604 or 610) associated with controller (e.g., FIG. 30, 602). This pressure can then be used to control the switching or timing of main switch valve (e.g., FIG. 29, 510) and pressure equalization valve to accomplish the proper pressure swing adsorption result. U.S. Pat. No. 4,449,990, which is hereby incorporated by reference, discloses one method of determining such timing requirements. Other methods may also be applicable.

In yet another embodiment, the demand control can be based on oxygen concentration output. In this mode, an oxygen sensor (e.g., FIG. 29, 536) is placed in the product gas output line and in circuit communication with controller (e.g., FIG. 30, 602). Controller monitors and compares the sensed oxygen concentration to a threshold value. If the sensed concentration is below the threshold value, any one or combination of steps can be taken including, but not limited to, changing the compressor and vacuum motor speed and adjusting the duty cycle of product flow control valve (e.g., FIG. 29, 540).

Figure 34:
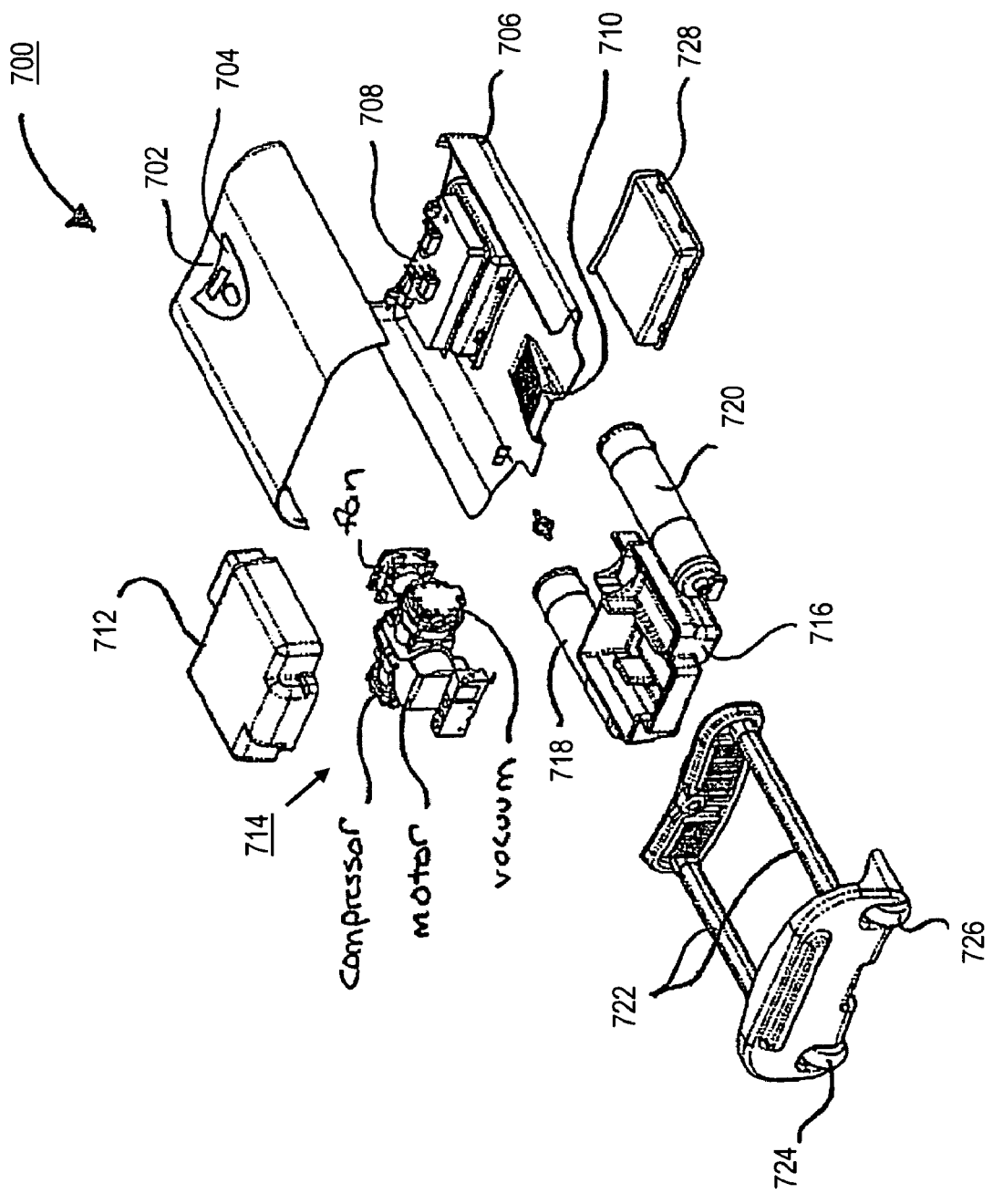
FIG. 34 is an exploded view of an exemplary embodiment of a product gas concentrator.

With reference to FIG. 34, an exemplary embodiment of a product gas concentrator 700 is presented in an exploded view. In this embodiment, the product gas concentrator 700 includes a front housing 702 with a user interface panel 704, a back housing 706 with an electronics assembly 708 and a vent port (grating) 710, an upper drive motor/compressor/vacuum pump housing 712 for deadening sound and vibration associated with the motor/compressor/vacuum pump/fan assembly 714, a lower drive motor/compressor/vacuum pump housing 716 for deadening sound and vibration and including first and second sieve beds 718, 720, a retractable hand rail housing 722 with first and second wheels 724, 726, and a battery pack 728.

Figure 35:
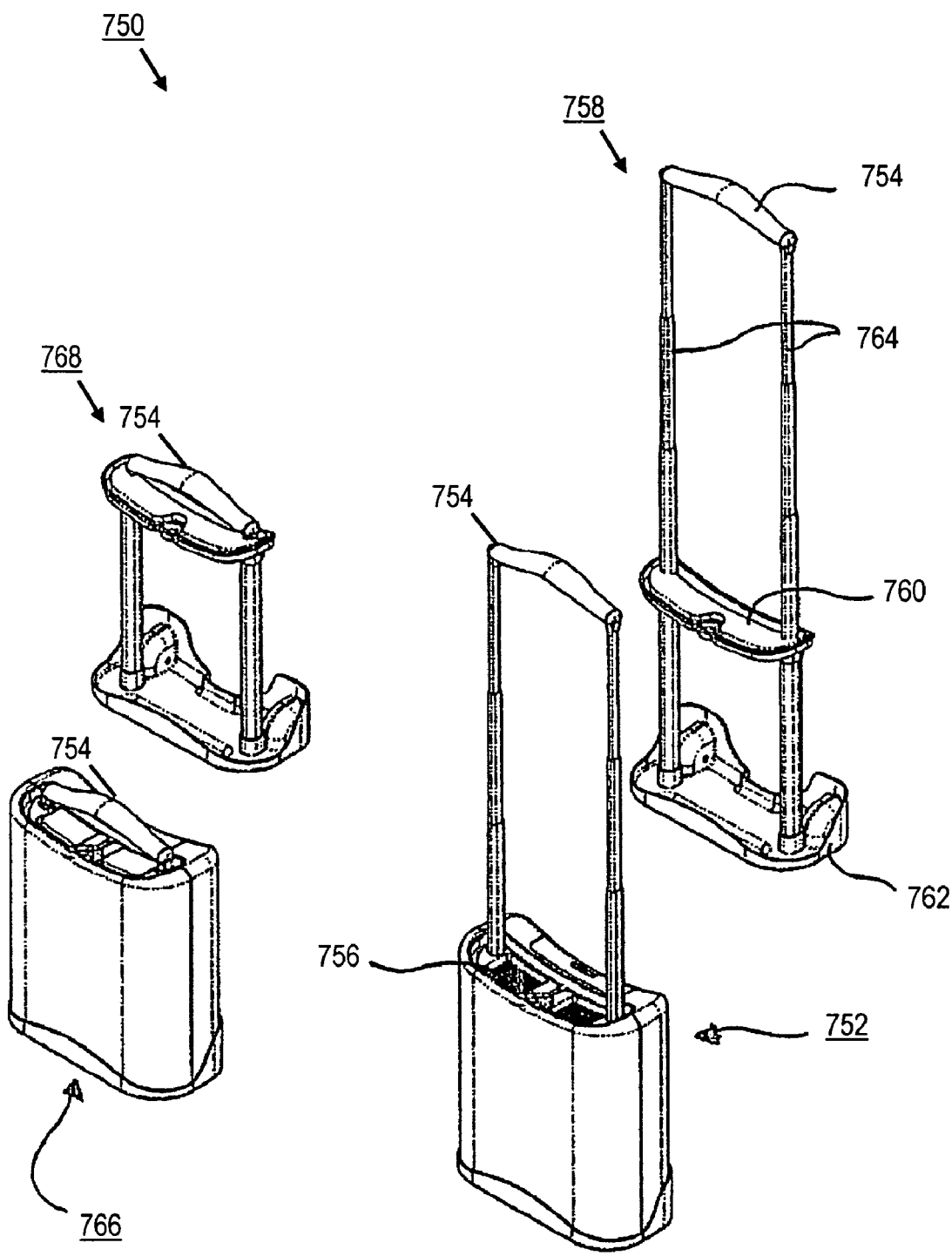
FIG. 35 shows several perspective views of an exemplary embodiment of a product gas concentrator.

With reference to FIG. 35, an exemplary embodiment of a product gas concentrator 750 is presented in a several perspective views. In a first view 752, the hand grip 754 is extended and a user outlet fitting 756 is opened to provide the user with access to the concentrated product gas. A second view 758 shows the retractable hand rail housing (e.g., FIG.

34, 722) with the hand grip 754 extended, a top housing 760, a bottom housing 762, and telescoping extendable/retractable rails 764. A third view 766 shows the hand grip 754 retracted. A fourth view 768 shows the retractable hand rail housing with the hand grip 754 retracted.

Figure 36:
FIG. 36 is a front view of an exemplary embodiment of a product gas concentrator.

With reference to FIG. 36 an exemplary embodiment of a product gas concentrator 770 is presented in a front view. In this embodiment, a user interface 772 with a display device 774, an up arrow pushbutton 776, a down arrow pushbutton 778, and a power switch 780 are shown.

Figure 37:
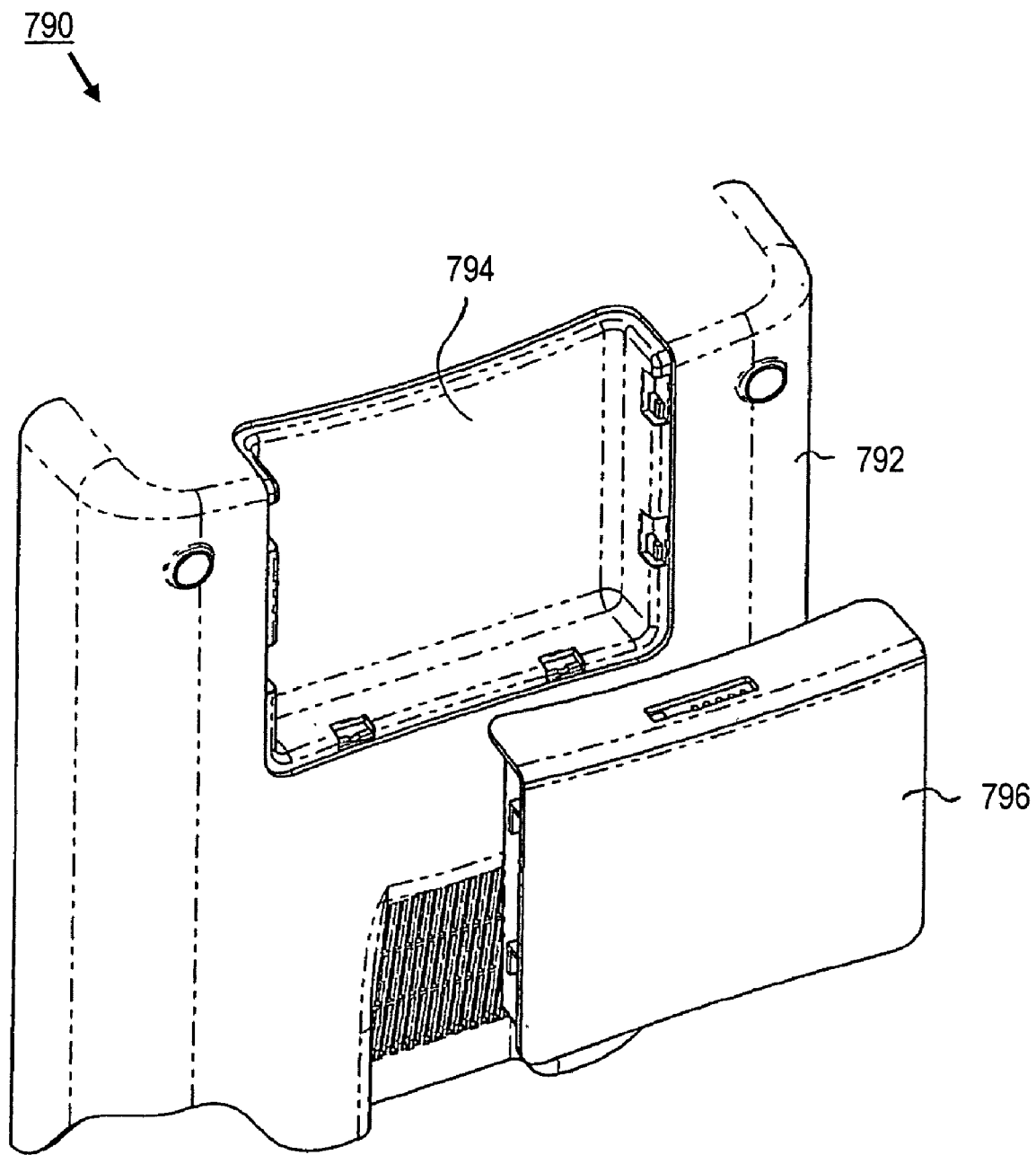
FIG. 37 is a rear view of an exemplary embodiment of a product gas concentrator.

With reference to FIG. 37 an exemplary embodiment of a product gas concentrator 790 is presented in a rear view. In this embodiment, a back housing 792, a battery compartment 794, and a battery pack 796 are shown.

Figure 38:
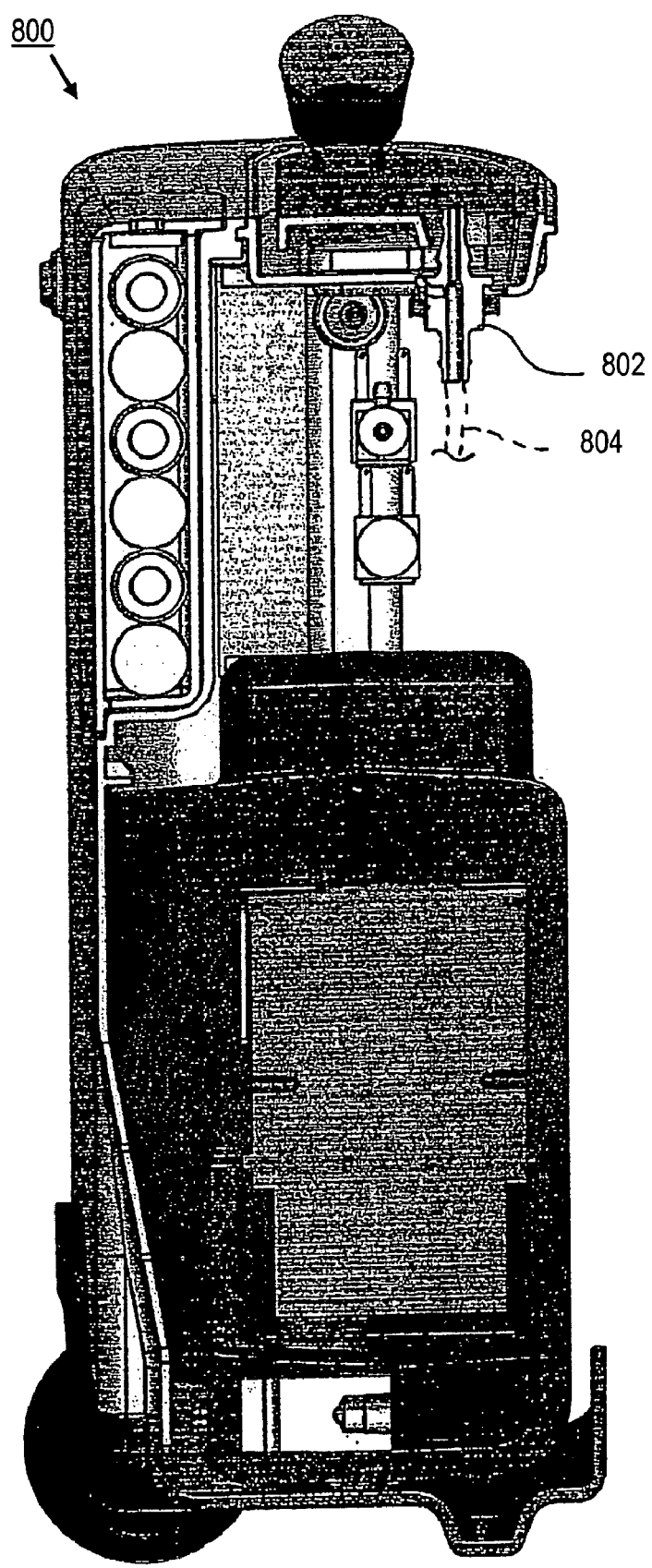
FIG. 38 is a side view of an exemplary embodiment of a product gas concentrator.

With reference to FIG. 38 an exemplary embodiment of a product gas concentrator 800 is presented in a side view. In this embodiment, a user outlet fitting 802 with a tube 804 connected thereto are shown.

While the apparatus and method of providing a concentrated product gas has been illustrated by the description of embodiments thereof, and while the embodiments have been described in considerable detail, it is not the intention of this specification to restrict or in any way limit the scope of the appended claims to such detail. Therefore, the apparatus and method of providing a concentrated product gas, in its broader aspects, is not limited to the specific details, the representative apparatus, and illustrative examples shown and described. Accordingly, departures may be made from such details without departing from the spirit or scope of the applicant's general concept for the apparatus and method of providing a concentrated product gas.

The invention claimed is:

1. An apparatus for providing a concentrated product gas, including:
   a gaseous component separation subsystem separating one or more adsorbable components from a source gaseous mixture to form a concentrated product gas;
   a continuous gas output adapted to provide the concentrated product gas in a continuous output mode;
   a pulsed gas output adapted to provide the concentrated product gas in a pulsed output mode; and
   a mode selection logic selectively switching between the continuous output mode and the pulsed output mode, the mode selection logic including:
      inspiration detection logic detecting inspiration by a user receiving the concentrated product gas in the pulsed output mode; and
      means for halting operation of the apparatus after no inspiration has been detected for a predetermined time.

2. The apparatus of claim 1, the mode selection logic including:
   an AC power source detection logic detecting that the apparatus is connected to an AC power source;
   a default output mode selection logic selecting the continuous output mode as a default output mode after connection to the AC power source is detected; and
   means for providing the concentrated product gas in the default output mode after initializing or resetting the apparatus.

3. The apparatus of claim 1, the mode selection logic including:
   one or more input devices adapted for selection of the continuous output mode or the pulsed output mode by a user; and
   means for selectively switching from the continuous output mode to the pulsed output mode and vice versa in response to a corresponding activation of the one or more input devices.

4. A method of providing a concentrated product gas, including:
   a) separating one or more adsorbable components from a source gaseous mixture to form a concentrated product gas;
   b) providing the concentrated product gas in a continuous output mode or in a pulsed output mode;
   c) in response to a predetermined condition, selectively switching between the continuous output mode and the pulsed output mode;
   d) detecting inspiration by a user receiving the concentrated product gas in the pulsed output mode; and
   e) halting operation after no inspiration has been detected for a predetermined time.

5. The method of claim 4, further including:
   f) detecting connection to an AC power source;
   g) selecting the continuous output mode as a default output mode after connection to the AC power source is detected; and
   h) providing the concentrated product gas in the default output mode after initializing or resetting.

6. The method of claim 4, further including:
   f) providing one or more input devices adapted for selection of the continuous output mode or the pulsed output mode by a user; and
   g) selectively switching from the continuous output mode to the pulsed output mode and vice versa in response to a corresponding activation of the one or more input devices.

7. An apparatus for providing a concentrated product gas, including:
   a pressurizing device pressurizing a source gaseous mixture to form a pressurized gaseous mixture;
   a gaseous component separation subsystem separating one or more adsorbable components from the pressurized gaseous mixture to form a concentrated product gas;
   a product tank in communication with the gaseous component separation subsystem, the product tank accumulating a volume of the concentrated product gas for dispensing;
   an output path in communication with the product tank and adapted to selectively dispense the concentrated product gas;
   a volume selection logic selecting a volume of concentrated product gas to be dispensed via the output path during a predetermined time;
   a pressure sensor monitoring a pressure of the concentrated product gas in the output path; and
   means for controlling a flow of the concentrated product gas though the output path in response to the selected volume and the monitored pressure.

8. The apparatus of claim 7 wherein the concentrated product gas is provided in a continuous output mode or a pulsed output mode;
   the pressurizing device including:
      a compressor adapted to pressurize the source gaseous mixture to form the pressurized gaseous mixture; and
      a variable speed drive motor in operative communication with the compressor and adapted to drive the compressor at a corresponding speed; and the means for controlling including:
         means for operating the variable speed drive motor at a speed corresponding to the selected volume; and means for adjusting the speed of the variable speed drive motor in response to at least one of the monitored pressure and the selected volume.

9. The apparatus of claim 7 wherein the concentrated product gas is provided in a continuous output mode;

the output path including:
a proportional flow control valve adapted to proportionately move between a closed position and an open position in relation to a variable control signal; and the means for controlling including:
means for setting the variable control signal to a level corresponding to the selected volume; and
means for adjusting the level of the variable control signal in response to at least one of the monitored pressure and the selected volume.

10. The apparatus of claim 9 wherein:
the gaseous component separation subsystem further including:
first and second sieve beds, each adapted to selectively receive the pressurized gaseous mixture, separate the one or more adsorbable components from the pressurized gaseous mixture, and provide the concentrated product gas to the product tank; and
a cross-over switching valve adapted to selectively switch between a first position connecting the pressurized gaseous mixture to the first sieve bed and a second position connecting the pressurized gaseous mixture to the second sieve bed; the means for controlling further including:
means for periodically changing the cross-over switching valve between the first and second positions to define a separating cycle with a first portion in which the first sieve bed receives the pressurized gaseous mixture and a second portion in which the second sieve bed receives the pressurized gaseous mixture;
wherein the first portion includes a first segment in which the first sieve bed separates the one or more adsorbable components from the pressurized gaseous mixture and a second segment in which the first sieve bed continues separating the one or more adsorbable components from the pressurized gaseous mixture and provides the concentrated product gas to the product tank;
wherein the second portion includes a third segment in which the second sieve bed separates the one or more adsorbable components from the pressurized gaseous mixture and a fourth segment in which the second sieve bed continues separating the one or more adsorbable components from the pressurized gaseous mixture and provides the concentrated product gas to the product tank; and the means for adjusting further including:
means for comparing a first monitored pressure associated with a transition from the first portion of the separating cycle to the second portion to a second monitored pressure during the third segment of the separating cycle to identify a first pressure decay;
means for determining a first volume of continuous concentrated product gas dispensed from the output path in relation to the first pressure decay;
means for comparing the first volume to the selected volume in relation to a known time between the first and second monitored pressures to determine a first coarse adjustment associated with a current level of the variable control signal; and
means for changing the current level of the variable control signal in relation to the first coarse adjustment.

11. The apparatus of claim 9, the means for adjusting further including:
means for periodically using a predetermined factor of a current monitored pressure to identify a current fine adjustment associated with a current level of the variable control signal; and
means for changing the current level of the variable control signal in relation to the current fine adjustment.

12. The apparatus of claim 7 wherein the concentrated product gas is provided in a pulsed output mode;
the output path including:
an output port adapted to provide the concentrated product gas to a user;
an inspiration path including a vent port adapted to receive atmospheric air and a flow sensor adapted to sense flow though the inspiration path, the inspiration path having an outlet end opposite the vent port; and
a two-position flow control valve adapted to selectively switch between a first position connecting the outlet end of the inspiration path to the outlet port and a second position connecting the output path from the product tank to the output port; and the means for controlling including:
first means for switching the two-position flow control valve to the second position in response to detecting flow through the inspiration path above a predetermined threshold when the two-position flow control valve is in the first position; and
second means for switching the two-position flow control valve from the second position to the first position in response to at least one of the selected volume and the monitored pressure.

13. The apparatus of claim 12, the means for controlling further including:
means for determining a breath rate associated with the user based on a sequence of detections of flow through the inspiration path above the predetermined threshold between switching cycles of the two-position flow control valve;
wherein the second means for switching the two-position flow control valve from the second position to the first position is also based at least in part on the determined breath rate.

14. The apparatus of claim 13, the second means for switching including:
means for determining a time required to dispense the selected volume of concentrated product gas in relation to the monitored pressure and the determined breath rate; and
means for allocating the determined time to pulse durations associated with individual pulses of concentrated product gas over the determined time;
wherein the second means for switching the two position flow control valve from the second position to the first position is based on a corresponding pulse duration for a current individual pulse of concentrated product gas.

15. A method of providing a concentrated product gas, including:
a) pressurizing a source gaseous mixture to form a pressurized gaseous mixture;
b) separating one or more adsorbable components from the pressurized gaseous mixture to form a concentrated product gas;
c) accumulating a volume of the concentrated product gas in a product tank for dispensing via an output path;

d) selecting a volume of concentrated product gas to be dispensed via the output path during a predetermined time;

e) monitoring a pressure of the concentrated product gas in the output path; and f) controlling a flow of the concentrated product gas through the output path in response to the selected volume and the monitored pressure.

16. The method of claim 15 wherein the concentrated product gas is provided in a continuous output mode or a pulsed output mode, the method further including:

g) providing a compressor adapted to pressurize the source gaseous mixture to form the pressurized gaseous mixture;

h) providing a variable speed drive motor in operative communication with the compressor and adapted to drive the compressor at a corresponding speed;

i) operating the variable speed drive motor at a speed corresponding to the selected volume; and j) adjusting the speed of the variable speed drive motor in response to at least one of the monitored pressure and the selected volume.

17. The method of claim 15 wherein the concentrated product gas is provided in a continuous output mode, the method further including:

g) providing a proportional flow control valve adapted to proportionately move between a closed position and an open position in relation to a variable control signal;

h) setting the variable control signal to a level corresponding to the selected volume; and i) adjusting the level of the variable control signal in response to at least one of the monitored pressure and the selected volume.

18. The method of claim 17, further including:

j) providing first and second sieve beds, each adapted to selectively receive the pressurized gaseous mixture, separate the one or more adsorbable components from the pressurized gaseous mixture, and provide the concentrated product gas to the product tank;

k) providing a cross-over switching valve adapted to selectively switch between a first position connecting the pressurized gaseous mixture to the first sieve bed and a second position connecting the pressurized gaseous mixture to the second sieve bed;

l) periodically changing the cross-over switching valve between the first and second positions to define a separating cycle with a first portion in which the first sieve bed receives the pressurized gaseous mixture and a second portion in which the second sieve bed receives the pressurized gaseous mixture, wherein the first portion includes a first segment in which the first sieve bed separates the one or more adsorbable components from the pressurized gaseous mixture and a second segment in which the first sieve bed continues separating the one or more adsorbable components from the pressurized gaseous mixture and provides the concentrated product gas to the product tank, wherein the second portion includes a third segment in which the second sieve bed separates the one or more adsorbable components from the pressurized gaseous mixture and a fourth segment in which the second sieve bed continues separating the one or more adsorbable components from the pressurized gaseous mixture and provides the concentrated product gas to the product tank; and m) comparing a first monitored pressure associated with a transition from the first portion of the separating cycle to the second portion to a second monitored pressure during the third segment of the separating cycle to identify a first pressure decay;

n) determining a first volume of concentrated product gas dispensed from the product tank in relation to the first pressure decay;

o) comparing the first volume to the selected volume in relation to a known time between the first and second monitored pressures to determine a first coarse adjustment associated with a current level of the variable control signal; and p) changing the current level of the variable control signal in relation to the first coarse adjustment.

19. The method of claim 17, further including:

j) periodically using a predetermined factor of a current monitored pressure to identify a current fine adjustment associated with a current level of the variable control signal; and k) changing the current level of the variable control signal in relation to the current fine adjustment.

20. The method of claim 15 wherein the concentrated product gas is provided in a pulsed output mode, the method further including:

g) providing an output port adapted to provide the concentrated product gas to a user;

h) providing an inspiration path including a vent port adapted to receive atmospheric air and a flow sensor adapted to sense flow through the inspiration path, the inspiration path having an outlet end opposite the vent port;

i) providing a two-position flow control valve adapted to selectively switch between a first position connecting the outlet end of the inspiration path to the outlet port and a second position connecting the output path from the product tank to the output port;

j) switching the two-position flow control valve to the second position in response to detecting flow through the inspiration path above a predetermined threshold when the two-position flow control valve is in the first position; and k) switching the two-position flow control valve from the second position to the first position in response to at least one of the selected volume and the monitored pressure.

21. The method of claim 20, further including:

l) determining a breath rate associated with the user based on a sequence of detections of flow through the inspiration path above the predetermined threshold between switching cycles of the two-position flow control valve, wherein the switching in k) is also based at least in part on the determined breath rate.

22. The method of claim 21, further including:

m) determining a time required to dispense the selected volume of concentrated product gas in relation to the monitored pressure and the determined breath rate; and n) allocating the determined time to pulse durations associated with individual pulses of concentrated product gas over the determined time, wherein the switching in k) is based on a corresponding pulse duration for a current individual pulse of concentrated product gas.

23. An apparatus for providing a concentrated product gas, including:

a gaseous component separation subsystem separating one or more adsorbable components from a source gaseous mixture to form a concentrated product gas;

a continuous gas output adapted to provide the concentrated product gas in a continuous output mode;

a pulsed gas output adapted to provide the concentrated product gas in a pulsed output mode; and a mode selection logic selectively switching between the continuous output mode and the pulsed output mode, the mode selection logic including:

an AC power source detection logic detecting that the apparatus is connected to an AC power source;

a default output mode selection logic selecting the continuous output mode as a default output mode after connection to the AC power source is detected; and means for providing the concentrated product gas in the default output mode after initializing or resetting the apparatus.

24. The apparatus of claim 23, the mode selection logic including:

an inspiration detection logic detecting inspiration by a user receiving the concentrated product gas in the pulsed output mode; and means for switching to the continuous output mode after no inspiration has been detected for a predetermined time.

25. The apparatus of claim 23, the mode selection logic including:

one or more input devices adapted for selection of the continuous output mode or the pulsed output mode by a user; and means for selectively switching from the continuous output mode to the pulsed output mode and vice versa in response to a corresponding activation of the one or more input devices.

26. A method of providing a concentrated product gas, including:

a) separating one or more adsorbable components from a source gaseous mixture to form a concentrated product gas;

b) providing the concentrated product gas in a continuous output mode or in a pulsed output mode;

c) in response to a predetermined condition, selectively switching between the continuous output mode and the pulsed output mode;

d) detecting connection to an AC power source;

e) selecting the continuous output mode as a default output mode after connection to the AC power source is detected; and f) providing the concentrated product gas in the default output mode after initializing or resetting.

27. The method of claim 26, further including:

g) detecting inspiration by a user receiving the concentrated product gas in the pulsed output mode; and h) switching to the continuous output mode after no inspiration has been detected for a predetermined time.

28. The method of claim 26, further including:

g) providing one or more input devices adapted for selection of the continuous output mode or the pulsed output mode by a user; and h) selectively switching from the continuous output mode to the pulsed output mode and vice versa in response to a corresponding activation of the one or more input devices.

* * * * *